United States Patent
Wolverton et al.

(10) Patent No.: US 11,664,526 B2
(45) Date of Patent: May 30, 2023

(54) ANIONIC REDOX ACTIVE LITHIUM IRON OXIDE BASED CATHODE MATERIALS FOR RECHARGEABLE LITHIUM ION BATTERIES

(71) Applicants: Northwestern University, Evanston, IL (US); UChicago Argonne, LLC, Chicago, IL (US)

(72) Inventors: Christopher M. Wolverton, Wilmette, IL (US); Zhenpeng Yao, Skokie, IL (US); Chun Zhan, Chicago, IL (US); Jun Lu, Chicago, IL (US); Khalil Amine, Chicago, IL (US)

(73) Assignees: Northwestern University, Evanston, IL (US); UChicago Argonne, LLC, Chicago, IL (US)

( * ) Notice: Subject to any disclaimer, the term of this patent is extended or adjusted under 35 U.S.C. 154(b) by 276 days.

(21) Appl. No.: 16/769,340

(22) PCT Filed: Dec. 6, 2018

(86) PCT No.: PCT/US2018/064321
§ 371 (c)(1),
(2) Date: Jun. 3, 2020

(87) PCT Pub. No.: WO2019/113362
PCT Pub. Date: Jun. 13, 2019

(65) Prior Publication Data
US 2021/0194042 A1   Jun. 24, 2021

Related U.S. Application Data

(60) Provisional application No. 62/596,285, filed on Dec. 8, 2017.

(51) Int. Cl.
*H01M 10/05* (2010.01)
*H01M 10/0525* (2010.01)
(Continued)

(52) U.S. Cl.
CPC ....... *H01M 10/0525* (2013.01); *H01M 4/523* (2013.01); *H01M 10/44* (2013.01)

(58) Field of Classification Search
CPC .......... H01M 10/0525; H01M 10/052; H01M 10/44; H01M 10/446; H01M 10/448;
(Continued)

(56) References Cited

U.S. PATENT DOCUMENTS 5,721,070 A * 2/1998 Shackle ................. H01M 4/58
429/231.1
8,313,721 B2 11/2012 Thackeray et al.
(Continued)

OTHER PUBLICATIONS

Toyoki Okumura et al., "Effect of Bulk and Surface Structural Changes in $Li_5FeO_4$ Positive Electrodes during First Charging on Subsequent Lithium-Ion Battery Performance," Journal of Materials Chemistry A, 2012, vol. 00, No. 1-3, pp. 1-11. DOI: 10.1039/x0xx00000x.
(Continued)

Primary Examiner — Raymond Alejandro
(74) Attorney, Agent, or Firm — Bell & Manning, LLC

(57) ABSTRACT

Cathode materials for lithium ion batteries, lithium ion batteries incorporating the cathode materials, and methods of operating the lithium ion batteries are provided. The materials, which are composed of lithium iron oxides, are able to undergo reversible anionic and cationic redox reactions with no $O_{2(g)}$ generation.

13 Claims, 14 Drawing Sheets

(51) Int. Cl.
H01M 4/52 (2010.01)
H01M 10/44 (2006.01)
(58) Field of Classification Search
CPC ........ H01M 4/523; H01M 4/525; H01M 4/48; H01M 4/134
See application file for complete search history.

(56) References Cited

U.S. PATENT DOCUMENTS

| | | |
|---|---|---|
| 2010/0227220 A1 | 9/2010 | Thackeray et al. |
| 2015/0004472 A1 | 1/2015 | Thackeray et al. |
| 2015/0064568 A1* | 3/2015 | Yushin ............... H01M 10/446 429/233 |

OTHER PUBLICATIONS

Mijung Noh et al., "Role of $Li_6CoO_4$ Cathode Additive in Li-Ion Cells Containing Low Coulombic Efficiency Anode Material," Journal of the Electrochemical Society vol. 159, No. 8, 2012, pp. A1329-A1334.

Young-Geun Lim et al., "Anti-fluorite $Li_6CoO_4$ as an alternative lithium source for lithium ion capacitors: An experimental and first principles study," Journal of Materials Chemistry A, 2012, vol. 00, No. 1-3, pp. 1-11. DOI: 10.1039/x0xx00000x.

Dong-Hwa Seo et al., "The structural and chemical origin of the oxygen redox activity in layered and cation-disordered Li-excess cathode materials," Nature Chemistry, May 30, 2016, vol. 8, No. 7, pp. 1-6. DOI 10.1038/nchem.2524.

M. Sathiya et al., "Electron paramagnetic resonance imaging for real-time monitoring of Li-ion batteries," Nature Communications, 6:6276; pp. 1-7, DOI: 10.1038/ncomms7276.

A. Grimaud et al, "Anionic redox processes for electrochemical devices," Nature Materials, vol. 15, Feb. 2016, pp. 121-126.

M. Freire et al., "A new active Li—Mn—O compound for high energy density Li-ion batteries," Nature Materials, vol. 15, Feb. 2016, pp. 173-178.

Paul E. Pearce et al., "Evidence for anionic redox activity in a tridimensional-ordered Li-rich positive electrode $\beta$-$Li_2IrO_3$," Nature Materials, Feb. 27, 2017, pp. 1-8. DOI: 10.1038/NMAT4864.

Sathiya, M. et al., "Reversible anionic redox chemistry in high-capacity layered-oxide electrodes," Nat. Mater. 12, 827-835 (2013).

McCalla, E. et al., Visualization of O—O peroxo-like dimers in high-capacity layered oxides for Li-ion batteries. Science 350, 1516-1521 (2015).

McCalla, E. et al., "Understanding the roles of anionic redox and oxygen release during electrochemical cycling of lithium-rich layered $Li_4FeSbO_6$," J. Am. Chem. Soc. 137, 4804-4814 (2015).

Luo, K. et al., "Charge-compensation in 3d-transition-metal-oxide intercalation cathodes through the generation of localized electron holes on oxygen," Nat. Chem. 8, 684-691 (2016).

Harada, K. et al., "Electrochemical reactions and cathode properties of Fe-doped $Li_2O$ for the hermetically sealed lithium peroxide battery," J. Power Sources 322, 49-56 (2016).

Imanishi, N. et al., "Antifluorite compounds $Li_{5+x}Fe_{1-x}Co_xO_4$ as a lithium intercalation host," J. Power Sources 146, 21-26 (2005).

Hirano, A. et al., "Electrochemical properties and Mössbauer effect of anti-fluorite type compound, $Li_5FeO_4$," Solid state ionics 176, 2777-2782 (2005).

The International Search Report and Written Opinion issued in International Patent Application No. PCT/US2018/064321 on Feb. 11, 2019; pp. 1-7.

Zhan et al., Enabling the High Capacity of Lithium-rich Antifluorite Lithium Iron Oxide by Simultaneous Anionic and Cationic Rodox: Nature Energy, vol. 2, Dec. 8, 2017 [retrieved on Jan. 12, 2019]. Retrieved from the Internet: ,URL: https://www.nature.com/articles/s41560-017-0043-6. pp. 963-971.

Lei Liang et al., "Synthesis and Characterization of Novel Cathode Material Li5FeO4 for Li-ion Batteries," Int. J. Electrochem. Sci., vol. 8, 2013, pp. 6393-6398.

S. Kirklin et al., "High-throughput screening of high-capacity electrodes for hybrid Li-ion/Li—$O_2$ cells," Physical Chemistry Chemical Physics, pp. 1-27.

C.S. Johnson et al., "$Li_2O$ Removal from $Li_5FeO_4$: A Cathode Precursor for Lithium-Ion Batteries," Chem. Mater. 2010, vol. 22, pp. 1263-1270. DOI: 10.1021/cm902713m.

L. Trahey et al., "Activated Lithium-Metal-Oxides as Catalytic Electrodes for Li—$O_2$ Cells," Electrochemical and Solid-State Letters, vol. 14, No. 5, 2011, pp. A64-A66. doi: 10.1149/1.3555366.

Michael M. Thackeray et al., "Vision for Designing High-Energy, Hybrid Li Ion/Li—$O_2$ Cells," J. Phys. Chem. Lett. 2013, vol. 4, No. 21, pp. 3607-3611. DOI: 10.1021/jz4018464.

S. Narukawa et al., "Anti-fluorite type $Li_6CoO_4$, $Li_5FeO_4$, and $Li_6MnO_4$ as the cathode for lithium secondary batteries," Solid State Ionics, vol. 122, Issues 1-4, Jul. 1, 1999, pp. 59-64. https://doi.org/10.1016/S0167-2738(99)00018-1.

* cited by examiner

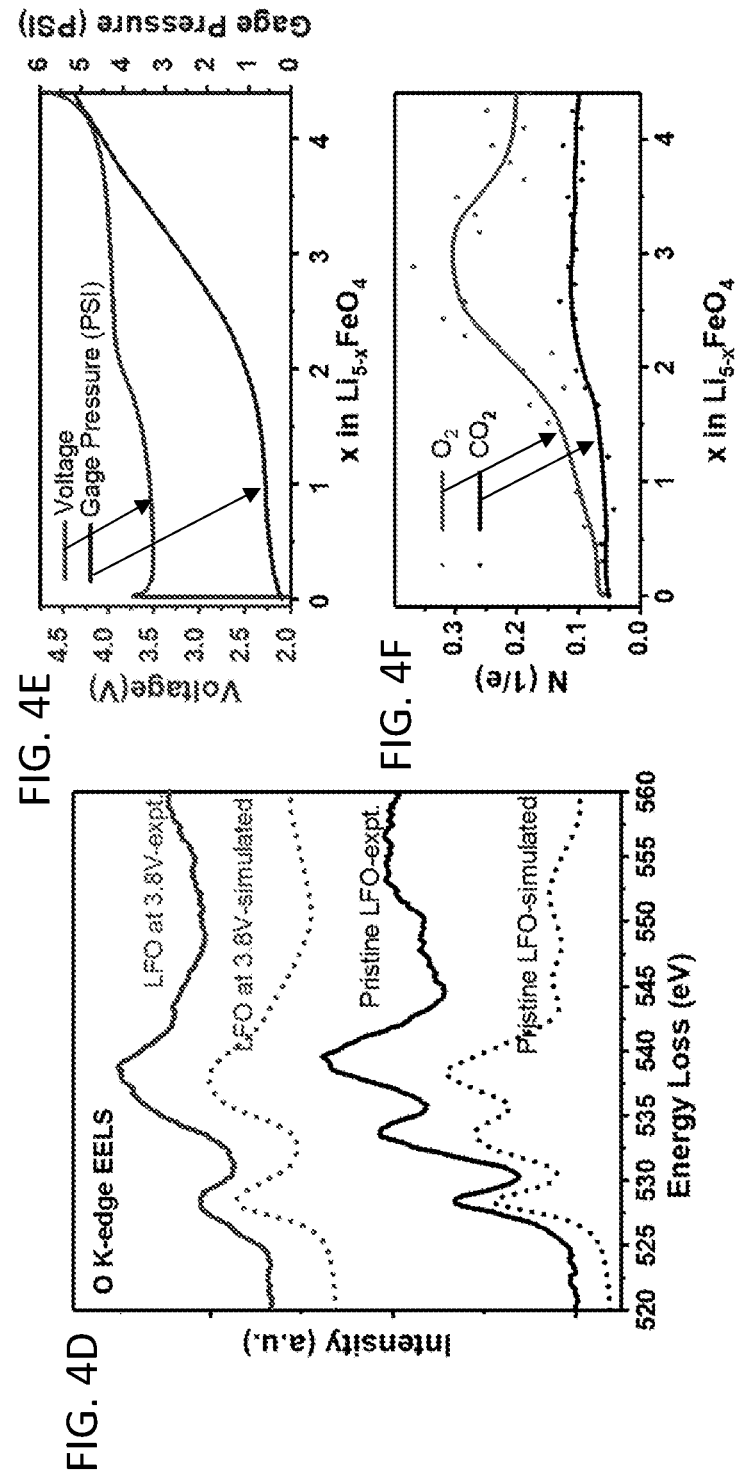

ANIONIC REDOX ACTIVE LITHIUM IRON OXIDE BASED CATHODE MATERIALS FOR RECHARGEABLE LITHIUM ION BATTERIES

CROSS-REFERENCE TO RELATED APPLICATIONS

This application is a National Stage of International Application No. PCT/US18/64321, filed Dec. 6, 2018, which claims the benefit of U.S. Patent Application No. 62/596,285, filed Dec. 8, 2017, the contents of which are herein incorporated by reference.

REFERENCE TO GOVERNMENT RIGHTS

This invention was made with government support under DEAC02-06CH11357 awarded by the U.S. Department of Energy. The government has certain rights in the invention.

BACKGROUND

Conventional cathode materials employed in lithium-ion batteries (LIBs) are generally lithiated transition metal (TM) oxide compounds. These materials store and release electrical energy when Li ions are extracted and inserted with charge compensation by redox reactions of the TM cations, respectively. The specific capacity (mAh/g) of these cathodes, therefore, is limited by the number of electrons per TM cation that can participate in the redox reactions and the relatively high atomic weight of the transition metal oxide host. The belief that these cathodes depend exclusively on the transition metal cations as the redox center in the cathode has been challenged by the discovery of oxygen redox reactivity in cathode materials of Li-excess layered oxide cathode. The opportunity has thus arisen to boost the capacity and energy density of lithium-ion batteries if the anionic and cationic redox activity can be enabled at the same potential. However, it is challenging to develop anionic-redox-based cathodes with acceptable cycle performance. A key issue is the irreversible $O_2$ gas release due to the instability of oxygenates (i.e. $O^-$ or $O_n^{2-}$) generated in the solid state. Stabilized oxygenate species in cathode materials using expensive 4d or 5d TM-metal ions, such as Ir and Ru, have been demonstrated. Nevertheless, inexpensive 3d TM-metal oxides are desirable to achieve highly reversible oxygen redox in practical applications.

In principle, $Li_2O$ with the anti-fluorite structure maximally exploits the anionic redox, as it only uses oxygen ions to provide the charge-compensating electrons in the lithiation/delithiation: $Li_2O \leftrightarrow 0.5Li_2O_2 + Li^+ + e^-$. The direct $Li_2O/Li_2O_2$ conversion requires a catalyst to promote the electrochemical reaction because of the low electrochemical activity and poor electronic conductivity of lithium oxides. The release of $O_2$ is often associated with this reaction due to the metastability of the delithiated $Li_2O$.

SUMMARY

Lithium ion batteries, methods for operating the batteries to power electronic devices and methods of making the batteries are provided.

One embodiment of a lithium ion battery includes a cell comprising: (a) a cathode comprising lithium iron oxides having the formula $Li_{5-2\alpha-x}FeO_{4-\alpha}$, where $0 \leq x \leq 1$ and $0 < \alpha < 2$; (b) an anode in electrical communication with the cathode; and (c) an electrolyte disposed between the anode and the cathode. The batter further includes a charge controller that limits the charging voltage of the cell to a voltage that maintains a at a value of less than 1 during charging. In some embodiments, $0 < \alpha < 1$.

One embodiment of a method of operating the lithium ion battery of the type described herein includes the steps of: (a) charging the cell using a charging voltage that maintains a at a value of less than 1 during charging; and discharging the cell to power a load connected across the cell.

One embodiment of a method of forming a lithium ion battery includes assembling a cell comprising: (a) a cathode comprising lithium iron oxides having the formula $Li_5FeO_4$; (b) an anode in electrical communication with the cathode; and (c) an electrolyte disposed between the anode and the cathode. During the initial charge, the charging voltage is limited to a voltage that converts the lithium iron oxides having the formula $Li_5FeO_4$ to lithium iron oxides having the formula $Li_{5-2\alpha-x}FeO_{4-\alpha}$, where $0 \leq x \leq 1$ and $0 < \alpha < 2$. In some embodiments, $0 < \alpha < 1$. A charge controller is connected to the cell to limits the charging voltage during subsequent charging cycles to a voltage that maintains a at a value of less than 1 during charging.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIGS. 4A-4D. Evolution of iron and oxygen in the first charge. In-situ Fe K-edge XANES (4A) and EXAFS (4B) spectra of LFO during the first charge to 4.7 V, corresponding to the stages denoted on the charging curve in (4C). The decrease of the shoulder peak B and the pre-edge peak C, as well as the gradual change of the three main peaks ($A_1$, $A_2$, and $A_3$ to $A_1'$ and $A_2'$), originated from the conversion of the $FeO_4$ tetrahedron in the pristine LFO to the $FeO_6$ octahedron in the DRP. The arrows in (4A) show the shift of the main edge in the two stages, while the arrows in (4B) show the decrease of Fe—O peak and the increase of Fe—Fe peak during the charging stage I. (4D) Experimental collected and simulated ex-situ O K-edge EELS of $Li_{5-x}FeO_4$ when x=0 and 2 in the first charge. The simulations were performed using the crystal structure obtained using the experimental results, which involved both the structural evolution and O redox. (4E) In-situ pressure measurement showing the gage pressure value inside the cell corresponding to changing voltage profile in the first cycle. (4F) Quantitative DEMS data of $O_2$ and $CO_2$ released in the LFO/Li cell in the first charge to 4.7 V. N(1/e) means the number of gas molecules generated by each electron. The lines show the smoothed curves using an FFT (Fast Fourier Transform) filter.

DETAILED DESCRIPTION

Figure 1A:
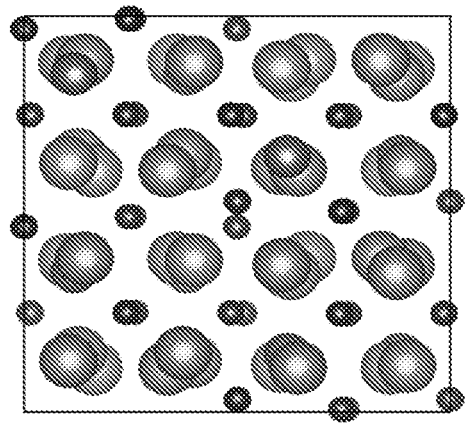
FIGS. 1A-1E. Phase conversion of LFO during electrochemical cycling. (1A) Structure of a 2×2×2 $Li_2O$ supercell and a $Li_5FeO_4$ unit cell both with the [100] view. (1B) The charge-discharge behavior of LFO in the first 6 cycles between 4.7 V and 1 V. (1C) The ex-situ Raman spectra obtained with 633 nm laser and ex-situ high energy XRD patterns (1D) collected at different states of charge and discharge corresponding to the points in a (labelled as appoint i-viii). The pristine LFO power and the cathode collected at points "i" and "ii" show typical features of the anti-fluorite $Li_5FeO_4$, with the prominent band at about 660 $cm^{-1}$ and multiple bands at lower frequency. (1E) 2D contour of in-situ XRD patterns collected in the first charge, illustrating the continuous evolution of XRD patterns from "i" to "viii" in FIG. 1D. The vertical dash lines in FIG. 1D and FIG. 1E label the diffraction peaks indexed to the (200), (220) and (222) planes of the disordered rocksalt phase.
Figure 1A:
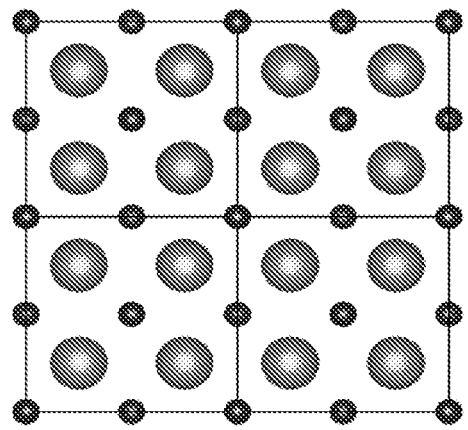
Figure 1A:
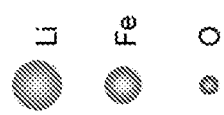

Cathode materials for lithium ion batteries, lithium ion batteries incorporating the cathode materials, and methods of operating the lithium ion batteries are provided. The materials, which are composed of lithium iron oxides having the formula $Li_{(5-2\alpha-x)}FeO_{(4-\alpha)}$, where $0\leq x\leq 1$ and $0<\alpha<1$ and a disordered rock salt structure, are able to undergo reversible anionic and cationic redox reactions at the same potential with substantially no $O_{2(g)}$ generation.

A basic embodiment of a lithium ion battery includes: a cathode; an anode in electrical communication with the cathode; an electrolyte disposed between the anode and the cathode; and a separator also disposed between the anode and the cathode.

The electrolytes are ionically conductive materials and may include solvents, ionic liquids, metal salts, ions such as metal ions or inorganic ions, polymers, ceramics, and other components. An electrolyte may be an organic or inorganic solid or a liquid, such as a solvent (e.g., a non-aqueous solvent) containing dissolved salts. Non-aqueous electrolytes can include organic solvents, such as cyclic carbonates, linear carbonates, fluorinated carbonates, benzonitrile, acetonitrile, tetrahydrofuran, 2-methyltetrahydrofuran, γ-butyrolactone, dioxolane, 4 methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethylether, and mixtures thereof. Example salts that may be included in electrolytes include lithium salts, such as $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y-1}SO_2)$, (where x and y are natural numbers), LiCl, LiI, and mixtures thereof.

The separators are typically thin, porous or semi-permeable, insulating films with high ion permeabilities. The separators can be composed of polymers, such as olefin-based polymers (e.g., polyethylene, polypropylene, and/or polyvinylidene fluoride). If a solid polymer electrolyte is used as the electrolyte, the solid polymer electrolyte may also act as the separator.

The anodes are composed of an active anode material that takes part in an electrochemical reaction during the operation of the battery. Example anode active materials include elemental materials, such as lithium; alloys including alloys of Si and Sn, or other lithium compounds; carbon, and intercalation host materials, such as graphite. By way of illustration only, the anode active material may include a metal and/or a metalloid alloyable with lithium, an alloy thereof, or an oxide thereof. Metals and metalloids that can be alloyed with lithium include Si, Sn, Al, Ge, Pb, Bi, and Sb. For example, an oxide of the metal/metalloid alloyable with lithium may be lithium titanate, vanadium oxide, lithium vanadium oxide, $SnO_2$, or $SiO_x$ (0<x<2).

The cathodes include lithium iron oxides that take part in an electrochemical reaction during the operation of the battery. The cathodes include lithium iron oxides having the stoichiometry $Li_{(5-2\alpha-x)}FeO_(4-\alpha)$, where $0\leq x\leq 1$ and $0<\alpha<2$, when the cathode is in a discharged state. In some embodiments, $0<\alpha<1$. By way off illustration, when the battery is it a charged state, the lithium iron oxides of the cathode comprise predominantly $Li_3FeO_{3.5}$ (for example, at least 50 weight percent (wt. %) of the lithium iron oxides comprise $Li_3FeO_{3.5}$, including at least 75 wt. % of the lithium iron oxides or at least 90 wt. % of the lithium iron oxides) and when the battery is it a discharged state the lithium iron oxides of the cathode comprise predominantly $Li_4FeO_{3.5}$ (for example, at least 50 wt. % $Li_4FeO_{3.5}$, including at least 75 wt. % or at least 90 wt. % $Li_4FeO_{3.5}$). During battery operation, lithium ions can be inserted/extracted reversibly from/to the electrolyte of the battery to/from the lithium sites of the $Li_{(5-2\alpha)}FeO_{(4-\alpha)}$ framework as the metal cation and oxygen anion are reduced/oxidized concurrently by charge compensating electrons supplied/removed by the external circuit of the battery in a discharge/charge cycle.

The cathodes are characterized in that they are able to provide simultaneous iron and oxygen redox activity with no, or substantially no, $O_{2(g)}$ generation, provided that the cut-off voltages for the initial charge and subsequent charging cycles are sufficiently low that delithiation does not proceed to the point that it becomes electrochemically irreversible, accompanied by the formation of $O^0$. A cathode can be considered to have substantially no $O_{2(g)}$ generation if the amount of $O_2$ gas given off is within or below the detection limits of the experimental example provided herein. As illustrated in the Example, for a $Li_5FeO_4$-based cathode in an uncharged state, reversible anionic redox activity without any significant $O_{2(g)}$ release can be accomplished using an initial charging voltage of 3.5 V or lower vs. Li+/Li and subsequent charging voltages of 3.8 V vs. Li+/Li, or lower. Because the initial charge cycle is used to "activate" the cathode material, it can be referred to as an activation charge cycle. The activation of the cathode can occur before or after the electrode is assembled into the electrochemical cell. The charging cut-off voltage can be limited using a charge controller connected to the cell that limits the maximum possible charging voltage. The charge controller can be, for example, a current controller or a voltage controller.

Batteries incorporating the cathode materials are able to provide a high specific capacities and high cyclabilities. For example, some embodiments of the batteries have a specific capacity of at least 180 mAh/g and do not exhibit rapid capacity fading within the first few charging cycles. As such, the batteries are useful for a variety of devices, including consumer electronics and power devices, electric vehicles, distributed energy storage for solar and wind, and advanced electric energy storage for smart grid applications.

Unless otherwise indicated, temperature and/or pressure dependent measured and calculated values recited herein refer to the values as measured or calculated at room temperature (23° C.) and atmospheric pressure.

EXAMPLE

In this example, the realization of simultaneous anionic and cationic redox in anti-fluorite structures, exemplified by $Li_5FeO_4$, at the same potential, is reported. Highly reversible anionic redox reactivity with no obvious oxygen release was enabled in this earth-abundant iron oxide under controlled voltage range. Also presented is a clear and quantitative picture of the structural and composition evolution of the LFO by ex-situ and in-situ XRD, Raman, pressure measurement, DEMS and XAENS, and first-principle calculations.

Simultaneous oxidation of $Fe^{3+}$ to $Fe^{4+}$ and $O^{2-}$ to $O^-$ was observed at approximately 3.5 V vs. Li+/Li during the extraction of the first two Li ions from LFO. After the initial extraction of two Li ions, the iron and oxygen redox couples were highly reversible within the solid state in subsequent cycles between 1.0 and 3.8 V vs. Li+/Li. A Li-excess $Li_6$—O configuration, identified by DFT calculations, played a key role in enabling the reversible $O^-/O^{2-}$ redox behavior.

Phase Conversion of LFO During Electrochemical Cycling

The crystal structure of $Li_5FeO_4$ can be viewed as substituting 24 $Li^+$ ions with 8 $Fe^{3+}$ ion and 16 cation vacancies in a 2×2×2 $Li_2O$ supercell (FIG. 1A). The charge-discharge behavior of LFO between 4.7 and 1.0 V is plotted in FIG. 1B. The initial charging curve exhibited two plateaus at about 3.5 V and 4.0 V, denoted stage I and stage II, respectively. In the first discharge to a potential as low as 1.0 V, two tilted plateaus at about 2.2 V and 1.5 V could be observed corresponding to the "insertion" of 1 Li ion at each plateau. The first charge to 4.7 V was electrochemically irreversible under the operating conditions employed here. In the following cycles, neither of the plateaus at 3.5 V and 4.0 V was recovered; instead, the charging and discharging curves showed a plateau at about 2.5 V, and the capacity faded rapidly in the first 5 cycles.

Figure 1C:
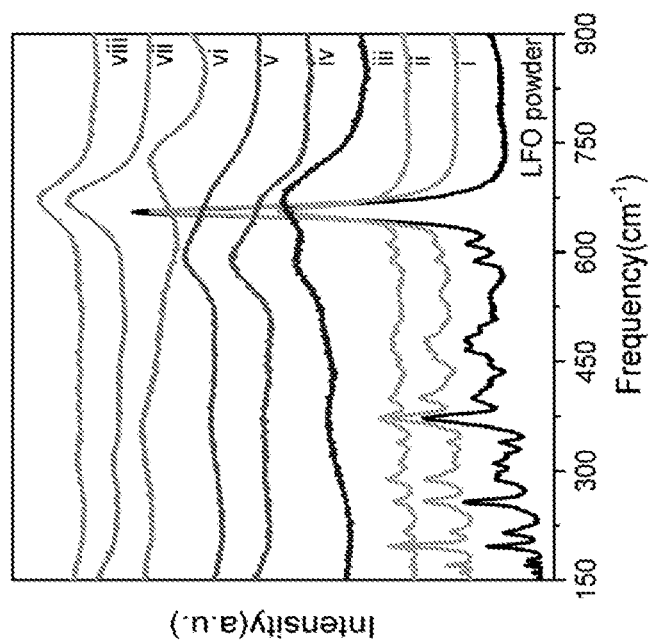
Figure 1B:
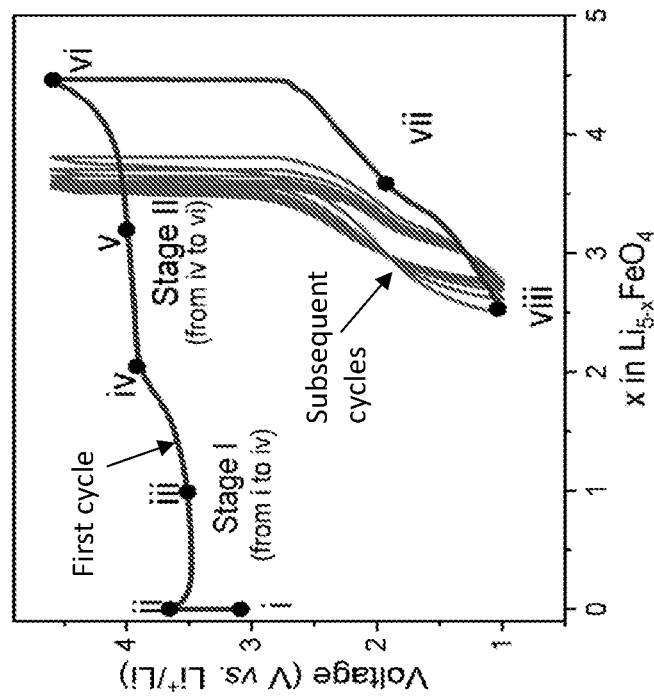
Figures 1D, 1E:
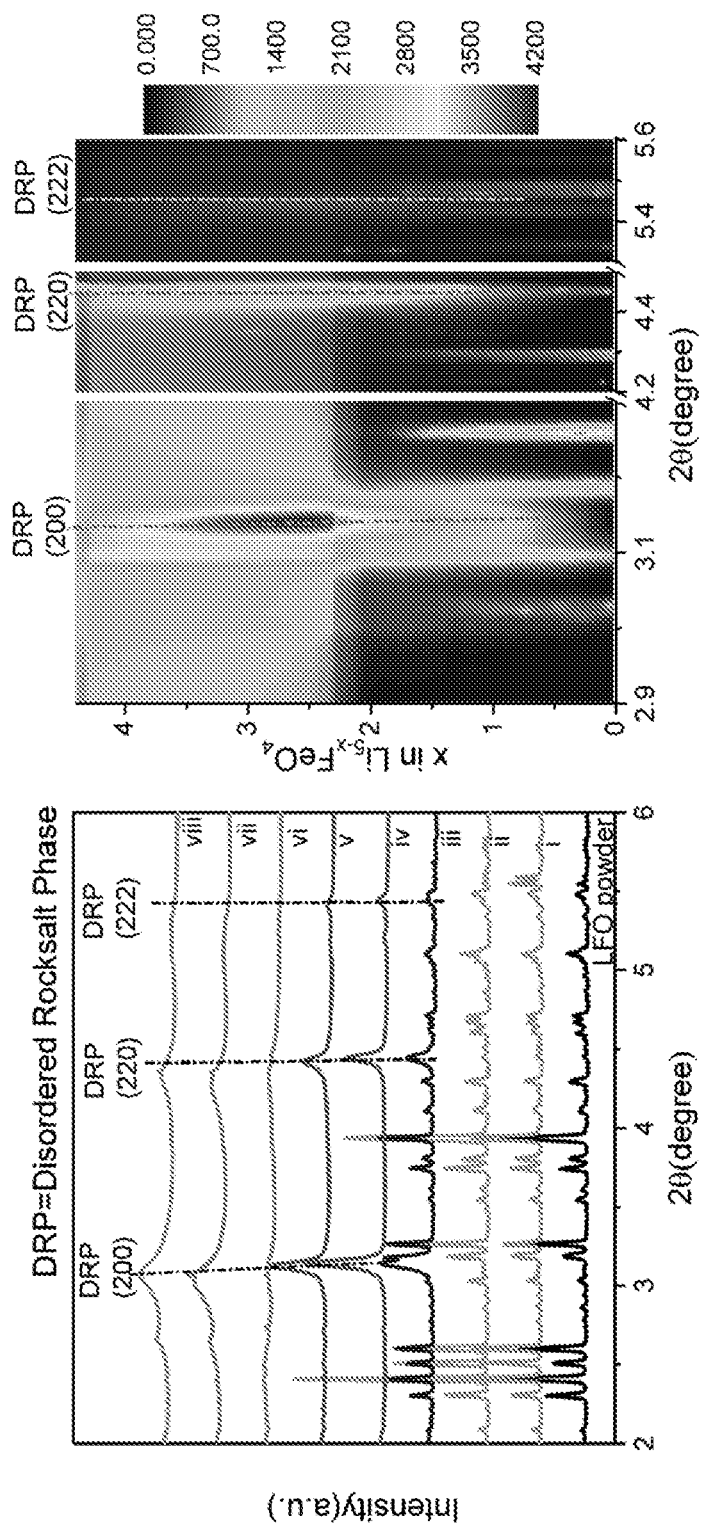

LFO electrodes at different states of charge in the first cycle (as labelled from i to viii in FIG. 1B) were harvested for ex-situ Raman and X-ray diffraction (XRD) analyses to determine the crystal phase conversion correlated with the plateaus, as shown in FIGS. 1C and 1D, respectively. A Raman spectrum was fitted at point c, and the XRD patterns were refined at points i, iv, and v. Both the ex-situ Raman and XRD profiles showed that the initial LFO with an orthorhombic structure (space group of Pbca) converted completely to a disordered rocksalt phase at the 3.5 V plateau with the removal of 2 Li ions (from point i to iv in FIG. 1B). This two-phase coexistence can be observed in the middle of the plateau (point iii in FIG. 1B), as shown by the XRD pattern (FIG. 1D). Continuous phase conversion in the first charge was demonstrated in the 2D contour of the in-situ XRD patterns (FIG. 1E). Gradual fading of the original anti-fluorite phase and growth of the disordered rocksalt phase was observed when 0<x<2.

Here, both the ex-situ and in-situ XRD patterns showed that the disordered rocksalt phase remained as the dominant phase on the 4.0 V plateau. The peaks of the DRP grew stronger at the beginning of the 4.0 V plateau (2<x<2.5), then started to get broader and weaker when x>2.5, and eventually become flattened at the end of charging. The XRD patterns of the DRP appeared again in the first discharge, but the anti-fluorite phase could not be recovered, confirming that deep delithiation of LFO is irreversible.

Figure 2B:
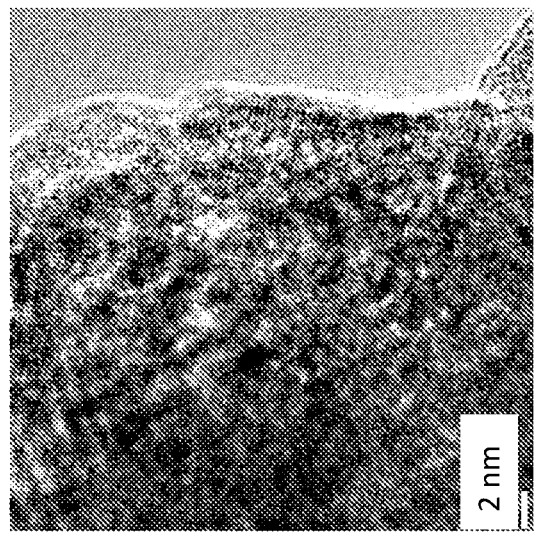
FIGS. 2A-2B. Morphology and structure change of $Li_5FeO_4$ during first charge. High-resolution TEM image (2A and 2B) of pristine $Li_5FeO_4$ (2A) and the sample charged to 3.8 V for the removal of 2 Li ions (2B). The micrometer size LFO particles break into nanoparticles due to the delithiation.
Figure 2A:
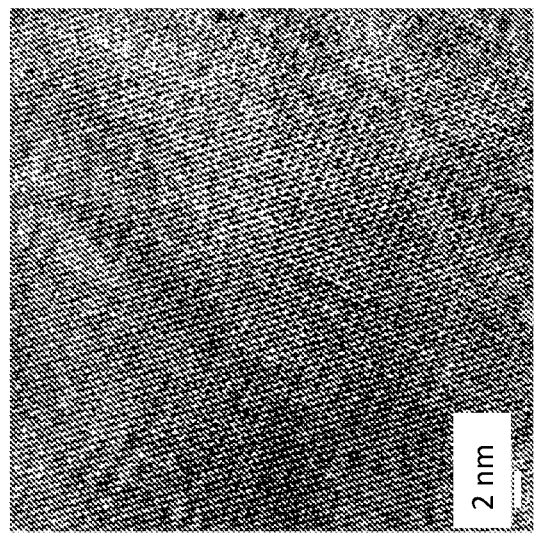

High-resolution images from transmission electron microscopy (TEM) helped explain the evolution of the XRD patterns. The pristine LFO consisted of well-crystallized particles of about 1 μm size, with the selected-area electron diffraction (SAED) pattern showing a typical single-crystal character (FIG. 2A). In contrast, after the removal of 2 Li ions, the single crystal of LFO broke into nanoparticles about 10 nm in size, with the overall shape maintained (FIG. 2B). The SAED pattern indicated a polycrystalline property of the particle, and the diffraction rings were well correlated with the XRD patterns.

Figures 3A, 3B, 3C:
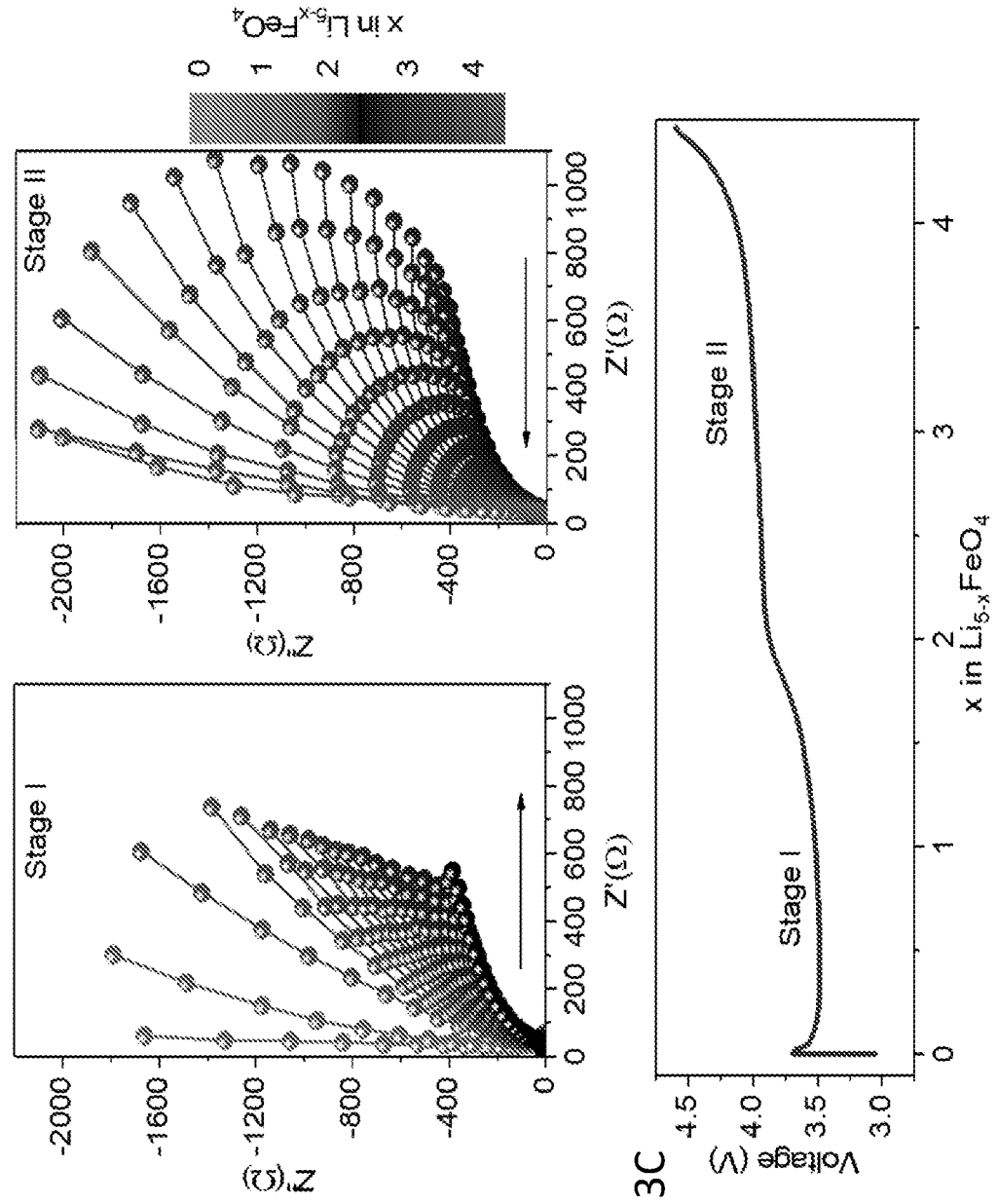
FIGS. 3A-3C. In-situ Electrochemical Impedance Spectra of $Li_5FeO_4$ during first charge. (3A) and (3B) show the EIS plots collected during the charging stage I and stage II as denoted in the voltage profile of the first charge of LFO to 4.7V, respectively. (3C). The shading of the lines and spheres represents the number of Li ions removed from the cathode, as demonstrated by the color scale bar on the right. The arrows in (3A) and (3B) show that the impedance of LFO decreases at the 3.5V plateau but increases at the 4.0V plateau. The EIS measurements were performed using a three-electrode cell with LFO as the working electrode, a Li wire as the reference electrode and a Li metal foil as the counter electrode. In this way, the impedance contribution of the Li metal anode can be eliminated.

The fracture of the active particles greatly increases the interface area between the cathode and electrolyte, which should lead to the impedance falling of the LFO cathode in the first plateau. This trend was observed in the in-situ electrochemical impedance spectra in FIGS. 3A-3C. Other possible reasons for this impedance falling include the enhanced charge conductivity due to the initial delithiation, and the electronic structure change of iron and oxygen ions. The impedance of the cathode reached the lowest level at the end of the first plateau, and then increased gradually with further delithiation at the second plateau. Further understanding of the electrochemistry in the delithiation to explain this V-shape evolution of impedance is discussed in detail in the 'Simultaneous cationic and anionic redox' section.

Cationic and Anionic Oxidation During the First Charge

Figures 4A, 4B, 4C:
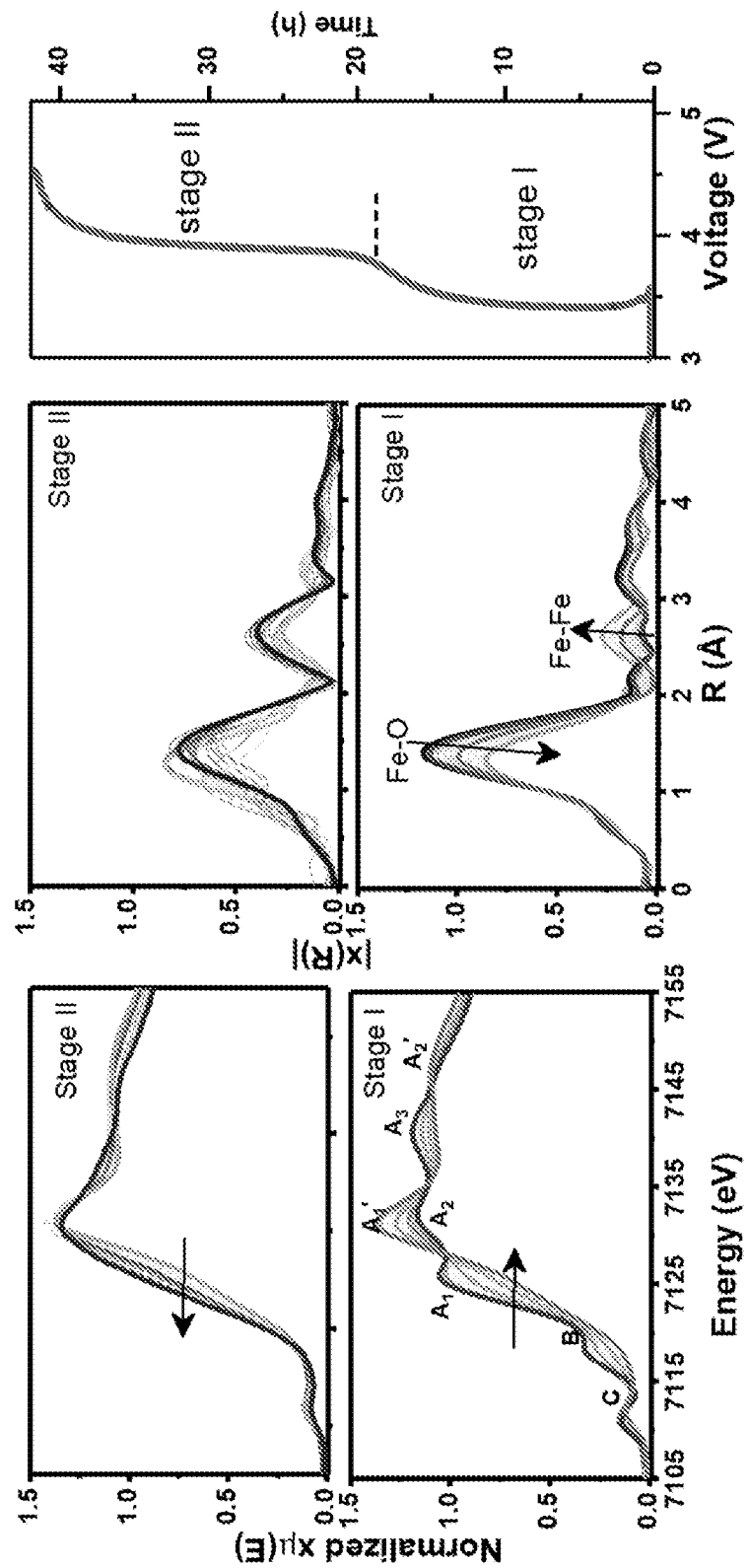

FIG. 4A shows the in-situ Fe K-edge X-ray absorption near edge spectra (XANES) of LFO during the first charge to 4.7 V. In Stage I (charge to 3.5 eV), the edge position of the main peak $A_1$, which is related to the oxidation state of Fe, shifted to higher energy ($A_1'$) due to the oxidation of $Fe^{3+}$ to $Fe^{(3+\delta)+}$ ($\delta \approx 0.5$) with extraction of the first two Li+ ions. This was an indirect indication that some other type of redox reaction was active, for $\delta$ should have been 2 if the Li removal had been fully charge-compensated by the Fe ion. The shoulder peak B and the strong pre-edge peak C are signatures of $FeO_4$ tetrahedral coordination. The pre-edge was partly caused by a quadrupole-allowed Fe 1s to 3d transition, which was also evident in the octahedral coordination, just not as strongly as in the tetrahedral coordination. The decrease of the intensity of peaks B and C, as well as the gradual change of the three main peaks ($A_1$, $A_2$, and $A_3$ to $A_1'$ and $A_2'$), originated from the conversion of the $FeO_4$ tetrahedron in the pristine LFO to the $FeO_6$ octahedron in the DRP. The disappearance of the $FeO_4$ tetrahedron was also evident in the Raman spectra (FIG. 1C). In contrast, during Stage II, the edge position of peak A shifted to lower energy, indicating that Fe was reduced during further removal of $Li^+$ without coordination change. Again, the reduction of Fe during charge indicated that some other species was being oxidized (i.e., O ions). This result is consistent with the ex-situ Fe Mossbauer spectra.

The Fe K-edge extended X-ray absorption fine structure (EXAFS) was measured to investigate bond distances and the local structure surrounding the Fe atoms. FIG. 4B shows the Fourier transform (FT) of the $k^2$-weighted EXAFS. The peak at ~1.5 Å corresponds to the Fe—O bond. The Fe—O bond in the pristine LFO was longer than that in the $FeO_6$ unit in $Fe_2O_3$, which demonstrated tetrahedral coordination of Fe in LFO. The Fe—O bond was gradually shortened at the end of Stage I, i.e., approaching the Fe—O bond length of the $FeO_6$ units in $Fe_2O_3$. The Fe—O bond distance did not change in an obvious manner during Stage II.

When comparing the number of Li ions extracted versus the valence change of Fe during the two plateaus, it was inferred that about (2-$\delta$) electrons per formula unit (or per Fe) were required from O atoms in the 3.5 V plateau, and another (2+$\delta$) electrons were required in the 4.0 V plateau. Therefore, the average valances of the four oxygen ions were expected to change from -2 to -(1.5+0.25$\delta$) and then to -1. The evolution of oxygen valence in the solid cathode was traced by ex-situ O K-edge electron energy loss spectroscopy (EELS) of pristine LFO and LFO charged to 3.8 V (FIG. 4D). Three peaks near 528.4 eV, 533.6 eV, and 539.4 eV were observed in the O K-edge spectrum of pristine LFO, whereas the spectrum for LFO after charging across the 3.5 V plateau exhibited only two board peaks at 528.4 eV and 538.2 eV. The drastic change in the EELS spectra shows the response of the oxygen electronic structure to Li electrochemical extraction, which may possibly be linked to a change in the oxygen bonding environment or oxygen redox. The experimentally observed O K-edge EELS spectra of pristine and delithiated LFO were confirmed by O core-level spectrum simulation.

FIGS. 4E and 4F show the in-situ pressure measurement and quantitative differential electrochemical mass spectrometry (DEMS) data of the LFO/Li cell in the first charge to 4.7 V. The pressure increase showed that a minor gas release was observed during the charge plateau at 3.5 V. Subsequently, a large amount of gas was released during the 4.0 V plateau. The calculation from DEMS data showed that about 0.1 $O_2$ gas molecules were released per electron on the first plateau. This number increased rapidly to about 0.3 $O_2/e^-$ when the potential rose to 4.0V.

Simultaneous Cationic and Anionic Redox

The composition of the product generated at the 3.5 V plateau was assumed to be $Li_\alpha Fe^{(4-\alpha)+}O_2$ by Okumura et al., but the (111)/(200) peak intensity ratio for this composition should have been much higher than that in their observed XRD profiles. (See, e.g., Okumura, T., et al., Effect of bulk and surface structural changes in $Li_5FeO_4$ positive electrodes during first charging on subsequent lithium-ion battery performance. *J. Mater. Chem.* A 2, 11847-11856 (2014).) They attributed the "mismatch" of I(111) to lattice distortion. This "mismatch" was also observed here and, indeed, could be eliminated by reducing the Fe/O ratio in the disorder rocksalt phase in the XRD Rietveld refinements. The refined occupancies of the atoms yielded a stoichiometry of $Li_3FeO_{3.5}$ for the DRP after the removal of two Li ions, which is consistent with the DFT simulations.

The O K-edge spectra for both $Li_5FeO_4$ and $Li_3FeO_{3.5}$ were simulated based on the DFT predicted structures, using the OCEAN code implementing the Bethe-Salpeter equation approach. (See, e.g., Gilmore, K. et al. Efficient implementation of core-excitation Bethe-Salpeter equation calculations. *Comput. Phys. Commun.* 197, 109-117 (2015); and Vinson, J., et al., Bethe-Salpeter equation calculations of core excitation spectra. *Phys. Rev. B* 83, 115106 (2011).) The simulated spectra were in excellent agreement with the EELS spectra (FIG. 4D). In order to determine the electronic origin of each peak, the simulated spectra were also compared with the projected ground-state density of states (DOS) of $Li_5FeO_4$ and $Li_3FeO_{3.5}$. The three peaks in the $Li_5FeO_4$ spectrum were attributed to electronic transitions from the O 1s core level to the unoccupied Fe 3d states (of $Fe^{3+}$ in tetrahedral sites) mixed with O 2p, and to delocalized O p states that were mixed with Fe states at higher energies. Similarly, the two peaks in the $Li_3FeO_{3.5}$ spectrum could be assigned to the empty 3d states of $Fe^{3+}$ and $Fe^{4+}$ that hybridized with O 2p, and also to O p mixed with Fe-d hybridization in the extended region. The fidelity of the $Li_3FeO_{3.5}$ structure model obtained from DFT calculation was thus corroborated by the close resemblance between the experimental and simulated O core-level spectra.

Therefore, the removal of the four Li ions can be expressed as following:

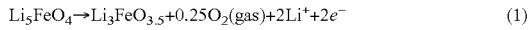
$$Li_5FeO_4 \rightarrow Li_3FeO_{3.5} + 0.25O_2(gas) + 2Li^+ + 2e^- \qquad (1)$$

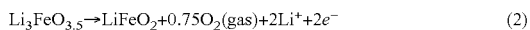
$$Li_3FeO_{3.5} \rightarrow LiFeO_2 + 0.75O_2(gas) + 2Li^+ + 2e^- \qquad (2)$$

The number of $O_2$ molecules released per electron was 0.125 at 3.5V [equation (1)] and 0.375 at 4V [equation (2)], which is close to the DEMS results. Based on the EELS and XANES results mentioned above, $Li_3FeO_{3.5}$ can be expressed as $Li_3(Fe^{3+}_{0.5}Fe^{4+}_{0.5})(O^{2-}_3 O^-_{0.5})$, which is also consistent with charge states deduced from DFT (see below). According to this electrochemistry, the lowest impedance of the cathode at around x=2 (FIGS. 3A-3C) can be originated from the high electrochemical activity of the $Fe^{4+}$ and $O^-$ in the $Li_3FeO_{3.5}$. In total, the removal of the first 2 $Li^+$ ions was charge-compensated by 1$e^-$ from the formation of oxygen vacancies (0.5 $O^{2-}$ to 0.25 $O_2$), 0.5 $e^-$ from oxygen redox in the solid state (0.5 $O^{2-}$ to 0.5 $O^-$), and 0.5 $e^-$ from Fe redox (0.5 $Fe^{3+}$ to 0.5 $Fe^{4+}$). Subsequently, 0.75 $O_2$ gas per formula unit was released from 0.5 $O^-$ plus one $O^{2-}$, providing 2 e⁻ for the removal of another 2 Li ions and 0.5 e⁻ for the reduction of 0.5 $Fe^{4+}$ back to 0.5 $Fe^{3+}$.

Figures 5A, 5B, 5C:
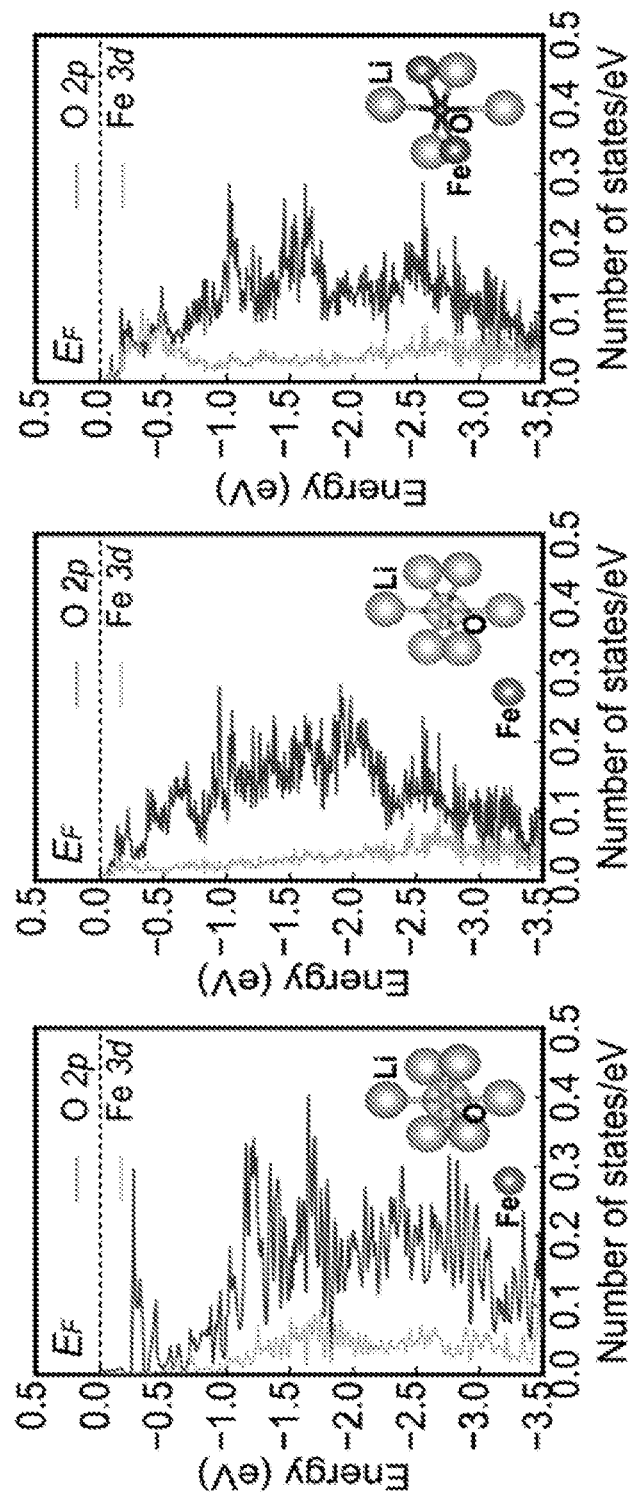
FIGS. 5A-5D. Effect of $Li_6$—O configurations on the electronic states of O ions in cation-disordered rocksalt phases. The $Li_6$—O configurations lead to the labile oxygen states. (5A)-(5C): Projected density of states (pDOS) of the O 2p orbitals and Fe 3d orbitals of: (5A) $O^{2-}$ ions in the $Li_6$—O configurations and nearest Fe ions in cation-disordered $Li_4FeO_{3.5}$, (5B) $O^{1-}$ ions in the $Li_6$—O configuration and nearest Fe ions in cation-disordered $Li_3FeO_{3.5}$, and (5C) $O^{2-}$ ions in Li/Fe-coordinated O configurations and nearest Fe ions in the cation-disordered $Li_3FeO_{3.5}$. Insets: isosurfaces of the charge density (yellow) around the oxygen ions in the energy range of 0 to −1.0 eV. Increased pDOS can be found near the Fermi level for the O ions coordinated by six Li, which originates from the particular $Li_6$—O configuration. (5D) Schematic of the role played by the $Li_6$—O configurations during the (de)lithiation of LFO. The irreversible delithiation from $Li_3FeO_{3.5}$ to $Li_2FeO_3$ and $LiFeO_2$ is accompanied by the oxidation of $O^-$ to $O^0$ and subsequent elimination of the $Li_6$—O configurations. Meanwhile, the $O^-$ ions in these $Li_6$—O configurations can be reversibly reduced to $O^{2-}$ on further lithiation instead of delithiation. Thus, the $O^-/O^{2-}$ redox can be reversible when the delithiation does not proceed beyond the point where $Li_6$—O configurations are eliminated.
Figure 5D:
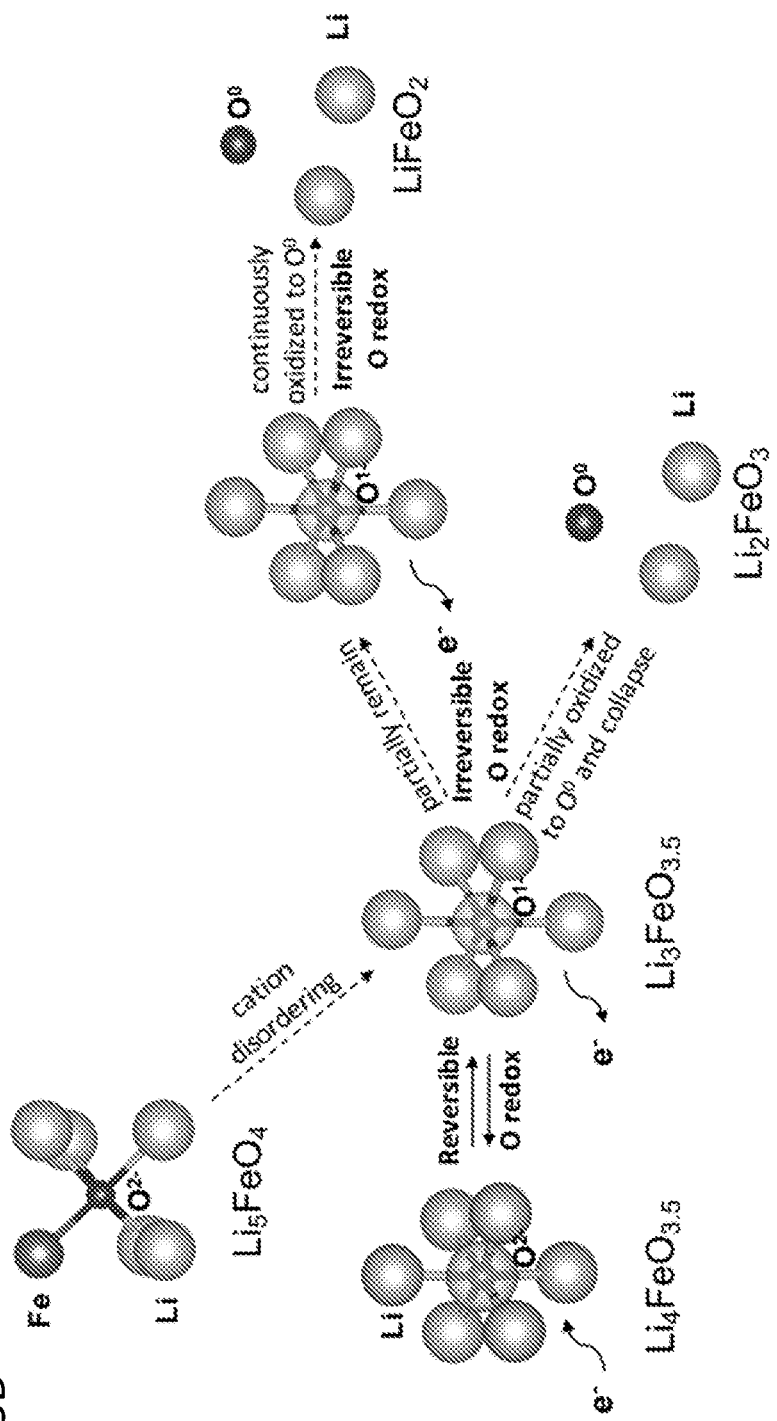

When comparing the results for LFO with those of layered oxides reported previously, it was found that the potential for oxygen redox (~3.5 V vs. $Li^+$/Li) and $O_2$ release (4.0 V vs. $Li^+$/Li) in the LFO cathode was lower than that in the layered oxides (4.2 V and 5 V vs. $Li^+$/Li, respectively, for $Li_4FeSbO_6$). (See, e.g., McCalla, E. et al. Understanding the roles of anionic redox and oxygen release during electrochemical cycling of lithium-rich layered $Li_4FeSbO_6$. *J. Am. Chem. Soc.* 137, 4804-4814 (2015).) One possible reason for the more facile oxygen redox is the difference in bonding or coordinate environment of the oxygen ions relative to the cation (Li/Fe) disordered sub-lattice in the DRP. Unlike conventional cubic cathode materials, which are well ordered and have only a single local environment for oxygen ions, a variety of local oxygen environments exist in cation disordered rocksalt phases. Through systematically calculating and examining the DOS and charge/spin density around oxygen ions in various local environments using DFT, it was demonstrated that the local configuration sensitively affects oxygen redox activity in LFO (FIGS. 5A-5C). To determine the oxidation states of oxygen ions, calculated magnetizations of oxygen ions were compared with the number of unpaired electrons of the corresponding ions at each oxidation state. In the resulting $Li_3FeO_{3.5}$ phase, DFT calculations showed that all the O⁻ ions shared a common "$Li_6$—O" configuration (FIG. 5D), with only Li ion coordination (first nearest neighbors), while the remaining oxygen ions stayed as $O^{2-}$ with at least one Fe first nearest neighbor. The projected DOS (pDOS) of the oxygen 2p states and 3d states of the nearest iron ion for $Li_6$—O and Fe-coordinated configurations were examined and are shown in FIGS. 5B-5C. A much greater pDOS from the oxygen states than from the iron states immediately below the Fermi level is found for the O⁻ ion coordinated with six Li ions (FIG. 5B). The origin of this increased DOS can be identified by visualizing the charge density around the oxygen ion for the energy range corresponding to the extraction of one electron (inset of FIG. 5B). It was found that the O⁻ in the local Li-excess environment originating from this particular $Li_6$—O configuration can emit one labile electron and become $O^0$ on further delithiation of $Li_3FeO_{3.5}$. The calculations indicated that the local coordination was responsible for oxygen redox ($O^{2-}$ to O⁻). It was found that the irreversible delithiation from $Li_3FeO_{3.5}$ to $Li_2FeO_3$ and $LiFeO_2$ was accompanied by gradual oxidation of O⁻ to $O^0$ and subsequent elimination of the "oxygen redox" specific $Li_6$—O configurations (FIG. 5D). Nevertheless, the O⁻ ions in these $Li_6$—O configurations should have been reversibly reduced to $O^{2-}$ on further lithiation instead of delithiation. Thus, the calculations revealed that the $O^-/O^{2-}$ redox can be reversible when the cut-off voltage for charging is lowered such that delithiation does not proceed to the point where $Li_6$—O configurations are eliminated (and $O^0$ is formed).

Reversibility of the Anionic and Cationic Redox

Figure 6A:
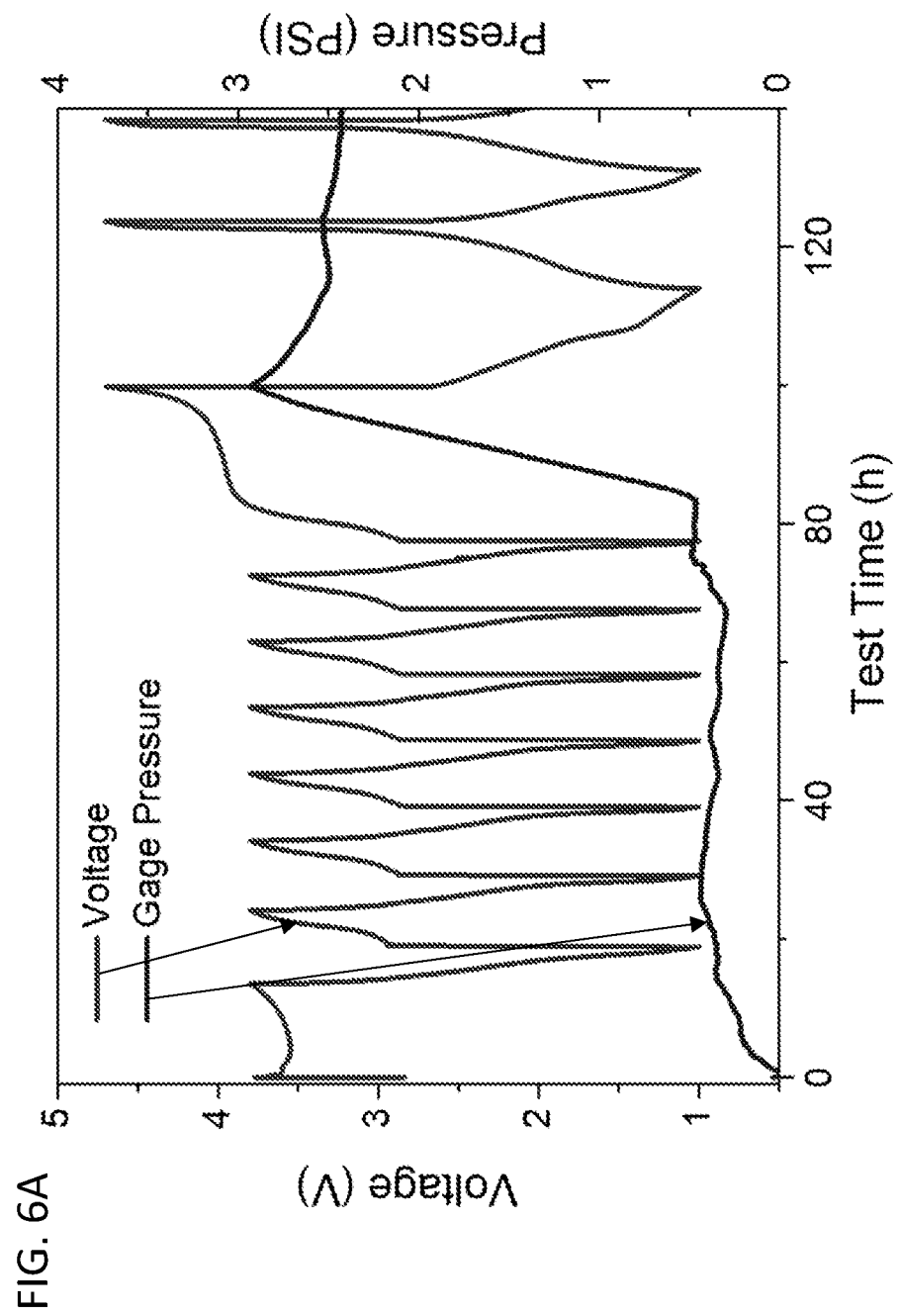
FIGS. 6A-6B. Onset voltage for $O_2$ gas release from $Li_5FeO_4$. (6A) The voltage profile and the in-situ pressure of the $Li_5FeO_4$/Li cells during cycles with upper cut-off voltage at 3.8 V. (6B) Performance of $Li_5FeO_4$ when cycled with cut-off voltage at 3.8 V and then 4.7 V vs. at 4.7 V from the beginning.
Figure 6B:
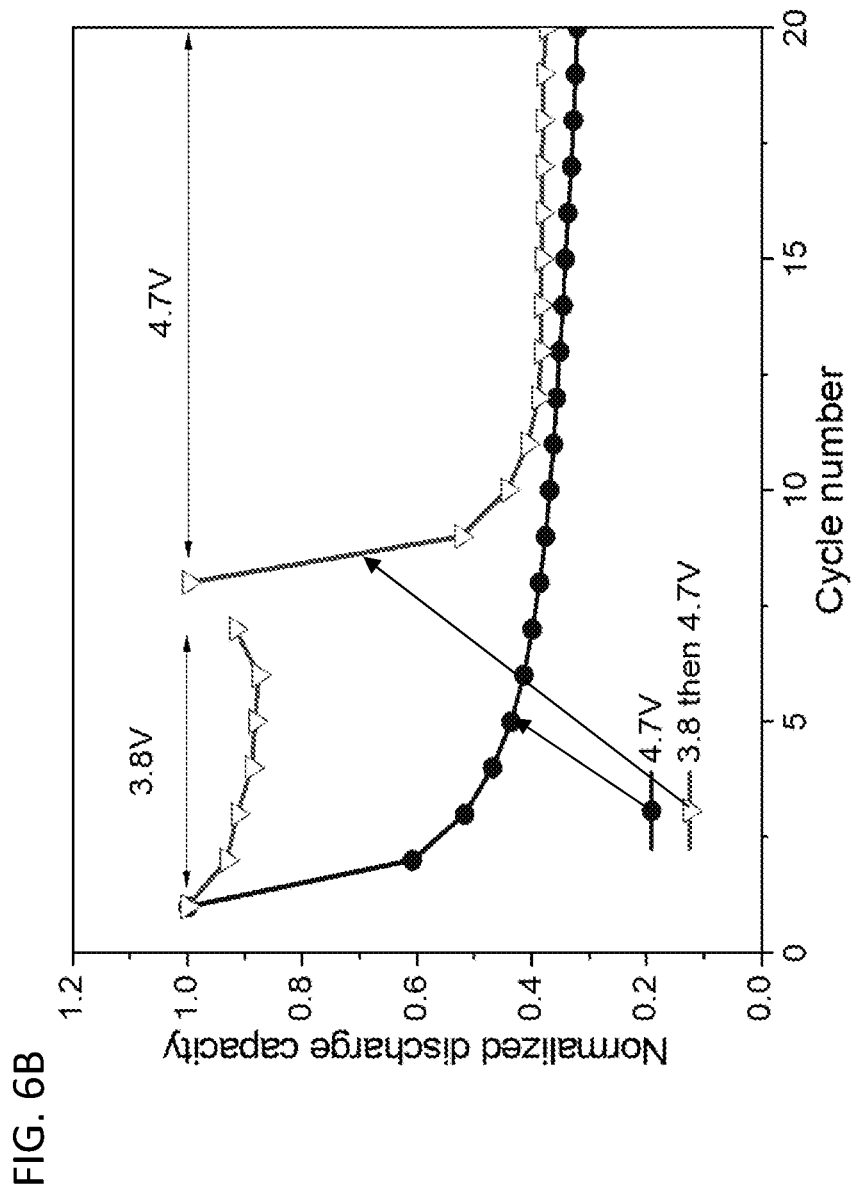

FIG. 6A shows the cycle performance and the in-situ gas release measurements for LFO during cycling between 1.0 and 3.8 V after the first 2-Li-ion extraction. As shown in FIG. 6A, no obvious gas release occurred when the cell was cycled with the upper voltage limited to 3.8 V. On the contrary, the gas pressure increased every time the cell was charged to 4.0 V. In addition, the noticeable gas release at the 4.0 V plateau was maintained after several cycles between 3.8 V and 1.0 V, confirming that the oxygen ion redox couple stays in the solid cathode when it is cycled below 3.8 V after the first 2 Li extraction. The cathode showed stable capacity when cycled with the upper voltage limit at 3.8 V, but not 4.7 V (FIG. 6B).

Figure 7A:
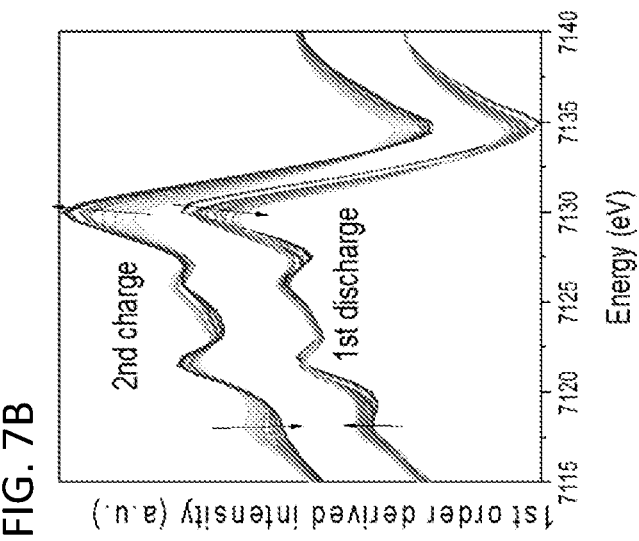
FIGS. 7A-7E. Reversibility of the $Fe^{3+}/Fe^{4+}$ redox couple. Normalized (7A) and first-order derived (7B) in-situ Fe K-edge XANES spectra collected on the LFO cathode during the $1^{st}$ discharge and the $2^{nd}$ charge after the initial charge to 3.8 V. 2D contour of (7A) and (7B) are graphed in (7C) and (7E), respectively, corresponding to the charge-discharge curve in (7D).
Figure 7B:
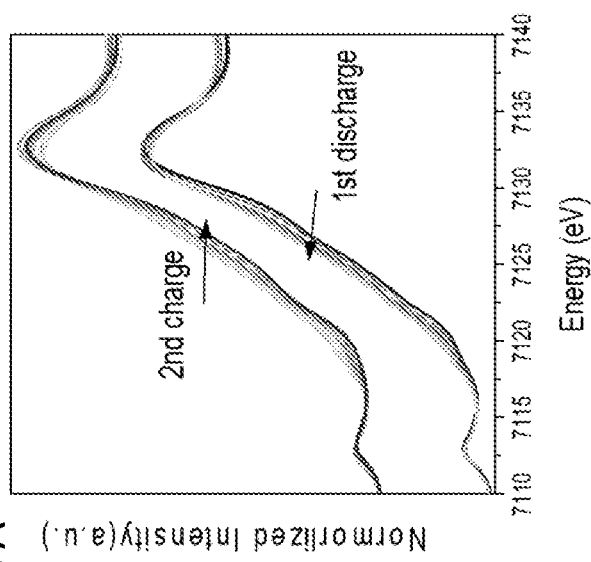
Figure 7C:
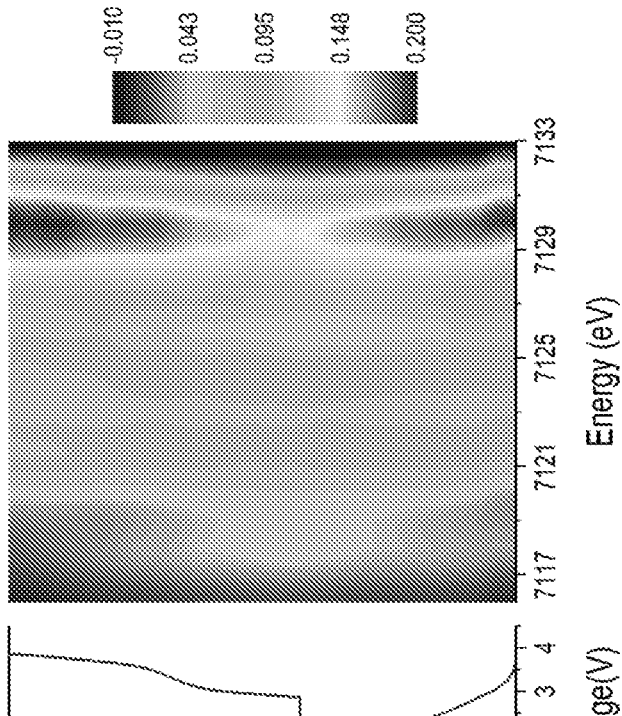
Figure 7D:
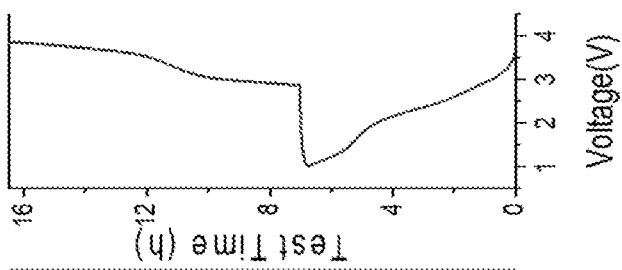
Figure 7E:
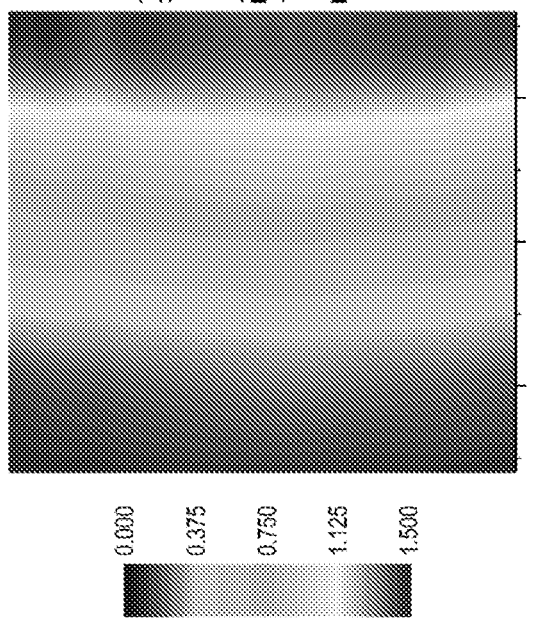

To study the reversibility of the $Fe^{3+}/Fe^{4+}$ redox couple, in-situ Fe K-edge XANES spectra were collected for the LFO cathode during the cycles after the first charge to 3.8 V, as shown in FIGS. 7A and 7B. During the discharge from 3.8 V to 1.0 V, the main Fe K-edge shifted back to around 7130 eV, confirming the reduction from $Fe^{(3+\delta)+}$ to $Fe^{3+}$. However, the typical tetrahedral $Fe^{3+}$ peaks and edges of the original LFO (shown in FIG. 7A) were not recovered. This finding indicates that the octahedral $Fe^{(3+\delta)+}$ in the DRP did not move back to a tetrahedral site (in the original LFO phase) after being reduced to $Fe^{3+}$. The irreversibility of the Fe redox in the first charge and discharge was consistent with the asymmetric voltage-capacity profile in the first cycle (FIG. D). On the other hand, after the first charge to 3.8 V, the Fe K-edge XANES showed a nearly symmetric pattern between the first discharge and second charge, as demonstrated in the 2D contour graphs (FIGS. 7C and 7E), indicating that $Fe^{(3+\delta)+}/Fe^{3+}$ at the octahedral site could be reduced and oxidized reversibly.

According to the DFT simulations of the lithiated phase ($Li_{\sim4}FeO_{3.5}$), the pDOS from the 2p states of the oxygen ions in the center of the $Li_6$—O configurations, which are inherited from the $Li_3FeO_{3.5}$, was confirmed to be greater than the pDOS from the 3d states of the nearest iron ions (FIG. 5A). Corresponding labile electron extraction/insertion from these $Li_6$—O configurations enabled the reversible $O^{2-}/O^-$ redox. As about 1 Li ion (corresponding to a capacity around 170 mAh/g) was involved in the first discharge and the following cycling between 1.0 and 3.8 V, about 0.5 e⁻ was provided by cationic redox (0.5 $Fe^{4+}\leftrightarrow$0.5 $Fe^{3+}$), and 0.5 e⁻ was then provided by anionic redox (0.5 $O^-\leftrightarrow$0.5 $O^{2-}$).

DISCUSSION

Figure 8:
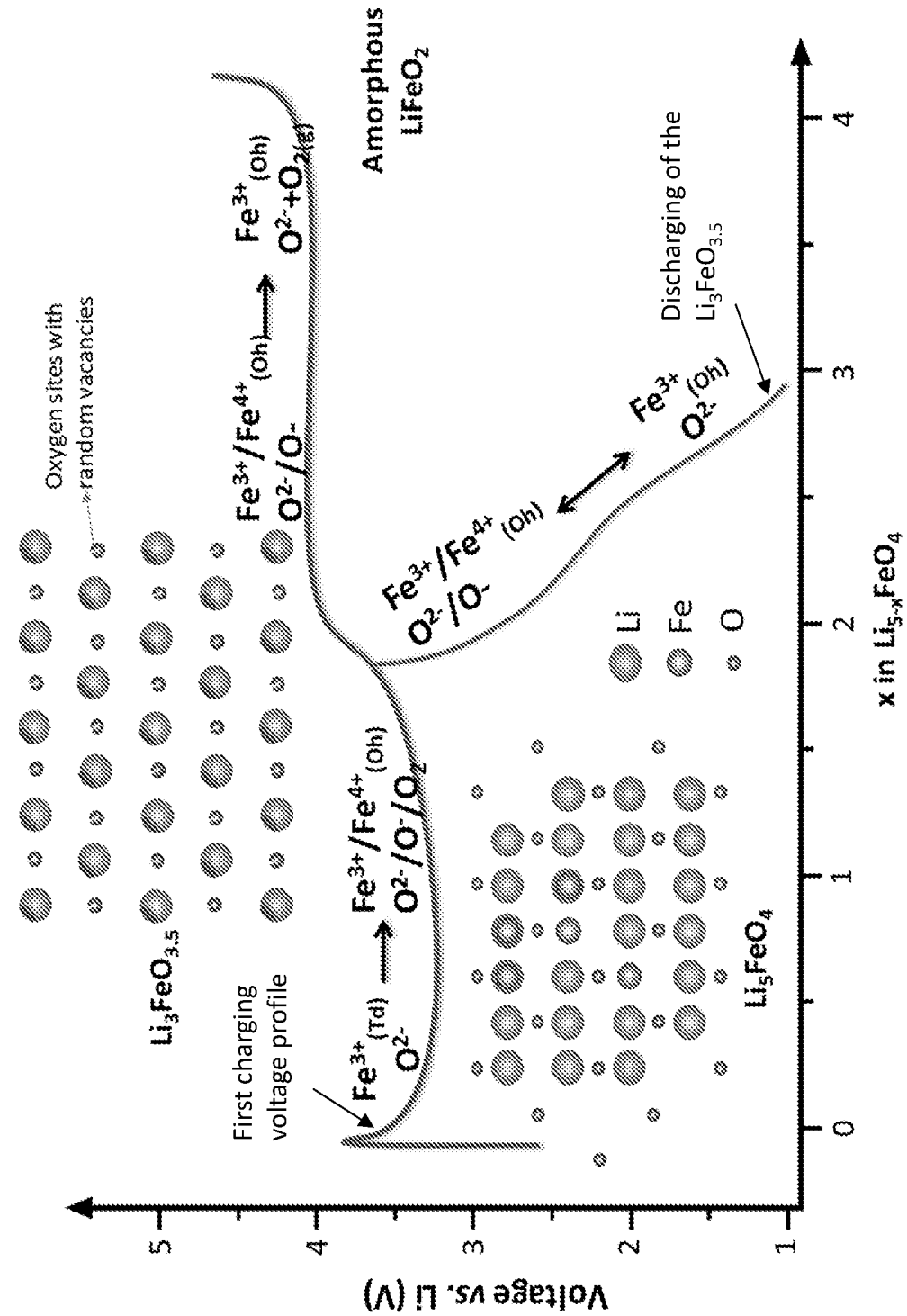
FIG. 8. Schematic of the structural change and redox reactions in $Li_5FeO_4$ during electrochemical cycling. For clarity, the structure of pristine $Li_5FeO_4$ is simplified as the standard anti-fluorite structure by ignoring the position offsets of the atoms. As the octahedral sites are fully occupied in $Li_3FeO_{3.5}$, the lithiation of $Li_3FeO_{3.5}$ occurs with the insertion of Li ions into the tetrahedral sites.

FIG. 8 summarizes the structural changes and redox reactions involved in the electrochemical cycling of LFO. With the removal of two Li ions on the 3.5 V plateau, Fe and Li ions migrated from tetrahedral sites to octahedral sites with a conversion from the anti-fluorite to a disordered rocksalt phase. At the same time, part of the $Fe^{3+}$ and part of the $O^{2-}$ were oxidized to $Fe^{4+}$ and O⁻, together with the formation of some oxygen vacancies. The $Fe^{4+}/Fe^{3+}$ and $O^-/O^{2-}$ redox coupled in the lattices were reversible, with substantial capacity retention in the subsequent cycles when the upper potential was limited to 3.8 V. Charging beyond 2 Li ions resulted in the reduction of $Fe^{4+}$ to $Fe^{3+}$, as well as $O_2$ gas release.

The combined experimental and computational studies in this work demonstrated how the coordination structure and bonding environment enabled the reversible oxygen redox in the 3d metal oxides. The $Li_2O$-like anti-fluorite structure facilitated oxygen redox potential lower than 3.8V, while the fully cationic disordered rock-salt phase generated in the charging stabilized the oxygenate species (i.e. O⁻) via $Li_6O$ configuration. In fact, the $Li_6$—O configuration could be tuned in the oxides by controlling the Li/TM disordering.

Methods

Material preparation and electrochemical tests. Li-rich anti-fluorite $Li_5FeO_4$ (LFO) powders were synthesized by solid state synthesis in an Ar-filled glovebox (details reported elsewhere). (See, e.g., Su, X. et al. A new strategy to mitigate the initial capacity loss of lithium ion batteries. *J. Power Sources* 324, 150-157 (2016).) Electrochemistry tests were performed with 2032 coin cells assembled with a cathode material of 80% LFO, 10% carbon black, and 5% polyvinylidene difluoride (PVDF) binder. The GenII electrolyte was used: 1.2 M LiPF$_6$ in ethylene carbonate (EC): ethyl methyl carbonate (EMC) at a 3:7 ratio by weight. If not otherwise specified, the cells were cycled with a constant current density of 19 mA g$^{-1}$ (about 1/40 C for the first charge).

The in-situ electrode electrochemical impedance spectra were collected with Li metal wire as the reference electrode, Li metal as the counter electrode and the LFO as the cathode, using a Solartron Analytical 1400 System. The AC amplitude was set at ±5 mV, and the applied frequency range was between 100 kHz and 0.05 Hz. In-situ pressure measurements were carried out in a home-modified system by connecting a pressure transducer (Omega®) to the open end of a Swagelok-type cell. Differential electrochemical mass spectrometer (DEMS) measurements were performed following the method described in detail elsewhere. (See, McCloskey, B. D., et al., Solvents' critical role in nonaqueous lithium-oxygen battery electrochemistry. *J. Phys. Chem. Lett.* 2, 1161-1166 (2011).) Gas in the cell was integrated and then collected to the mass spectrometer every hour in the charging.

Material characterizations. High-energy synchrotron X-ray diffraction (XRD) measurements were carried out at the 11-ID-C beamline of the Advanced Photon Source (APS), Argonne National Laboratory. The wavelength of the X-Ray was 0.11165 nm. The XRD patterns were collected in the transmission mode using a Perkin Elmer large area detector. The collected two-dimensional patterns were then integrated into conventional one-dimensional patterns (intensity versus 2θ) for final data analysis using the Fit2d software. An XRD Rietveld refinement was carried out with the Fullprof Suite 2012®.

Transmission electron microscopy (TEM) images and selected area electron diffraction (SAED) patterns were taken by a field-emission transmission electron microscope (FEI Titan 80-300ST) with a spherical and chromatic aberration imaging corrector working at 80 kV. Spherical and chromatic aberration correction enabled the microscope to attain resolution better than 0.1 nm (measured by Young's fringes) at 80 kV.

X-ray absorption spectroscopy (XAS) measurements at Fe K-edge were completed at the APS on the bending-magnet beamline 9-BM-B with an electron energy of 7 GeV and an average current of 100 mA. The incident beam was monochromatized by a Si(111) double-crystal monochromator. Harmonic rejection was accomplished with a 25% detune. The monochromator energy was calibrated with an Fe foil by setting the first derivative maxima to 7110.75 eV. In-situ XAS experiments were performed on the coin cells with a window of 3-mm diameter sealed with 50-μm-thick Kapton tape in transmission mode. The cells were cycled with a MACCOR cycler. Data reduction and analysis were performed by using the ATHENA software. (See, Ravel, B. et al., ATHENA, ARTEMIS, HEPHAESTUS: data analysis for X-ray absorption spectroscopy using IFEFFIT. *J. Synchrotron Rad.* 12, 537-541 (2005).)

Ex-situ Mossbauer spectroscopy was conducted on cycled electrodes. Cathode laminates at selected state-of-charges were removed from the coin cells and covered with Kapton tape to reduce effects from the outside environment. The measurements were performed in transmission geometry with a 20 mCi $^{57m}$Co in Rh source and a Peltier cooled silicon detector. The isomer shift (IS; measured relative to an α-Fe foil) and the quadrupole splitting (QS) values were obtained by a least-squares fitting of the data using Lorentzian functions.

DFT calculations. First principles calculations were performed using the Vienna Ab-initio Simulation Package (VASP) and the projector augmented wave (PAW) potentials. (See, Kresse, G. et al., Ab initio molecular dynamics for liquid metals. *Phys. Rev. B* 47, 558-561 (1993); Kresse, G. et al., Ab initio molecular-dynamics simulation of the liquid-metal-amorphous-semiconductor transition in germanium. *Phys. Rev. B* 49, 14251-14269 (1994); Kresse, G. et al., Efficiency of ab-initio total energy calculations for metals and semiconductors using a plane-wave basis set. *Comput. Mater. Sci.* 6, 15-50 (1996); Kresse, G. et al., Efficient iterative schemes for ab initio total-energy calculations using a plane-wave basis set. *Phys. Rev. B* 54, 11169-11186 (1996); and Blöchl, P. E. Projector augmented-wave method. *Phys. Rev. B* 50, 17953-17979 (1994).) The generalized gradient approximation (GGA) of Perdew-Becke-Ernzerhof (PBE) was used for the exchange-correlation functional. (See, Perdew, J. P. et al., Rationale for mixing exact exchange with density functional approximations. *J Chem. Phys.* 105, 9982-9985 (1996).) A plane-wave basis set with a cut-off energy of 520 eV and Γ-cantered k-meshes with an approximate density of 8000 k-points per reciprocal atom was used in all calculations. The DFT+U method was used to treat Fe-3d ($U_{Fe}$=4.0 eV) states following previous work. (See, Thackeray, M. M., et al., Vision for designing high-energy, hybrid Li ion/Li—O$_2$ cells. *J. Phys. Chem. Lett.* 4, 3607-3611 (2013); Wang, L. et al., Oxidation Energies of Transition Metal Oxides within the GGA+U Framework. *Phys. Rev. B* 73, 195107 (2006); Zhou, F., et al., Phase separation in Li$_x$FePO$_4$ induced by correlation effects. *Phys. Rev. B* 69, 201101 (2004); Kirklin, S. et al., The Open Quantum Materials Database (OQMD): assessing the accuracy of DFT formation energies. *npj Comput. Mater.* 1, 15010-15024 (2015); and Saal, J. et al., Materials Design and Discovery with High-Throughput Density Functional Theory: The Open Quantum Materials Database (OQMD). *JOM* 65, 1501-1509 (2013).)

Density Functional Theory (DFT) Calculations Methodology

Since the delithiated phases of Li$_4$FeO$_{3.5}$, Li$_3$FeO$_{3.5}$, and Li$_2$FeO$_3$ adopted disordered cubic structures, the corresponding computational unit cells were built using the special quasi-random structure (SQS) method. Starting from the cubic rock-salt cell, supercells containing 30 cation sites/30 anion sites, 56 cation sites/56 anion sites, and 27 cation sites/27 anion sites were created for Li$_4$FeO$_{3.5}$, Li$_3$FeO$_{3.5}$, and Li$_2$FeO$_3$, respectively. The cation sites were populated randomly with Fe and Li in ratios of 4:1, 3:1, and 2:1 for Li$_4$FeO$_{3.5}$, Li$_3$FeO$_{3.5}$, and Li$_2$FeO$_3$, respectively. Vacancies were introduced to the anion sites of the Li$_4$FeO$_{3.5}$ and Li$_3$FeO$_{3.5}$ structures randomly in ratios of 3:7 and 1:7 with respect to O, while all the anion sites of Li$_2$FeO$_3$ were occupied by O. All SQSs were generated based on a Monte Carlo algorithm implemented in ATAT with the constraint that the pair and triplet correlation functions of the SQS were identical to those of the statistically random Li/Fe population of cation sites and O/vacancy population of anion sites at least up to the third nearest neighbor. (See, Cockayne, E. et al., Building effective models from scarce but accurate data: Application to an alloy cluster expansion model. *Phys. Rev. B* 81, 12104-12113 (2010); van de Walle, A. Multicomponent multisublattice alloys, nonconfigurational entropy and other additions to the Alloy Theoretic Automated Toolkit. *Calphad* 33, 266-290

(2009); van de Walle, A. Methods for first-principles alloy thermodynamics. *JOM—J. Min. Met. Mat. S.* 65, 1523-1532 (2013); van de Walle, A. A complete representation of structure-property relationships in crystals. *Nat. Mater.* 7, 455-458 (2008); van de Walle, A. et al., Self-driven lattice-model Monte Carlo simulations of alloy thermodynamic properties and phase diagrams. *Model. Simul. Mater. Sc.* 10, 521-539 (2002); van de Walle, A. et al., The Alloy Theoretic Automated Toolkit: A user guide. *Calphad* 26, 539-553 (2002); van de Walle, A. et al., Automating first-principles phase diagram calculations. *J. Phase Equilib.* 23, 348-368 (2002); van de Walle, A. et al., First-principles thermodynamics of coherent interfaces in samarium-doped ceria nanoscale superlattices. *Phys. Rev. Lett.* 98, 266101-266118 (2007); van de Walle, A. et al. Ab initio calculation of anisotropic interfacial excess free energies. *Phys. Rev. B* 89, 184101-184111 (2014); van de Walle, A. et al. The free energy of mechanically unstable phases. *Nat. Commun.* 6, 7559-7564 (2015); and van de Walle, A. et al. Efficient stochastic generation of special quasirandom structures. *Calphad* 42, 13-18 (2013).) According to the XRD observations, the $LiFeO_2$ phase showed features of amorphization. A corresponding amorphous computational cell containing 100 atoms was constructed by ab initio molecular dynamics (AIMD) simulation to a liquid-like state at 2900 K, followed by a rapid temperature quench and energy minimization. (See, Bin, H. et al. A high-performance anode material based on $FeMnO_3$/graphene composite. *J. Alloys Compd.* 695, 1223-1230 (2017); and Li, Q. et al. Electrochemistry of Selenium with Sodium and Lithium: Kinetics and Reaction Mechanism. *ACS Nano* 10, 8788-8795 (2016).) The liquid state configurations were equilibrated over two picoseconds under a constant-volume, constant-temperature canonical (NVT) ensemble. The quench was enabled through an AIMD run starting at the equilibration temperature and dropping down to 300 K at the rate of 1 K/fs, followed by conjugate-gradient relaxation of atomic coordinates and cell parameters, until the force on each atom fell below $10^{-2}$ eV/Å.

The oxygen K-edge spectra simulations were performed using the OCEAN package that implements the Bethe-Salpeter equation (BSE) approximation, which was built upon the DFT ground-state charge density and Kohn-Sham Hamiltonian. (See, Vinson, J., Rehr, J. J., Kas, J. J. & Shirley, E. L. Bethe-Salpeter equation calculations of core excitation spectra. *Phys. Rev. B* 83, 115106 (2011); and Gilmore, K. et al. Efficient implementation of core-excitation Bethe-Salpeter equation calculations. *Comput. Phys. Commun.* 197, 109-117 (2015).) The DFT routine was performed with the ABINIT package. (See, Gonze, X. et al. First-principles computation of material properties: the ABINIT software project. *Comput. Mater. Sci.* 25, 478-492 (2002).) Local density approximation (LDA) was employed for the exchange-correlation functional. Norm-conserving pseudopotentials from the ABINIT distribution were used, in conjunction with a cutoff energy of 70 Ry. The size of k-point grid used to solve the Kohn-Sham states for BSE was 4×4×4 for $Li_5FeO_4$ and 3×3×2 for $Li_3FeO_{3.5}$, and the screening calculations for both structures used a 2×2×2 k-point grid. The number of unoccupied bands used for the BSE calculation was at least 800, and the screened core-hole potential calculation included at least 1300 bands. Each oxygen atom in the simulation cell was considered as the absorbing atom. The polarization vectors were set to be [100], [010], and [001], and the final spectrum was obtained by averaging the spectra generated by all oxygen atoms using each of the polarization vectors.

O Core-Level Spectra

The absorption peaks in the O K-edge spectra can be attributed to the peaks in the ground-state density of the oxygen p states.

The simulated O K-edge spectrum of $Li_5FeO_4$ was compared with its ground-state DOS. It can be inferred from the DOS plot that the unoccupied states consisted of three sub-bands, whose positions roughly coincided with the three peaks in the simulated spectra. The lowest-energy sub-band appeared to be the narrowest, which was also consistent with the simulated spectrum. The DOS plot clearly showed Fe-d and O-p hybridization. The hybridized state at 2.5-3.5 eV was dominated by Fe-d characteristic, while the higher-energy sub-bands had more O-p than Fe-d character, but also had additional Fe-s and Li components and were highly delocalized. The low-energy region of the DOS plot was again dominated by the Fe contribution, and the delocalized O-p and Fe-d hybridized states seemingly manifested themselves as the broad peak in the simulated spectrum that was higher in energy (7.1-13.2 eV). However, unlike that of $Li_5FeO_4$, for $Li_3FeO_{3.5}$, the Fe and O contributions in the 3.5-7.1 eV region were small, which was likely to result in the valley seen in the simulated spectrum (as indicated by the arrow). Therefore, the distinct features (number of peaks, peak splitting, etc.) of $Li_5FeO_4$ and $Li_3FeO_{3.5}$ core-level spectra can qualitatively be explained by using the ground-state DOS.

Magnetizations and Valence States of Fe and O Ions

The oxidation states of Fe and oxygen ions in the original $Li_5FeO_4$ and following delithiated phases ($Li_{5-x}FeO_{4-y}$) were determined as follows: $Li_3FeO_{3.5}$, $Li_2FeO_3$ and $LiFeO_2$. The oxidation states were determined by comparing calculated magnetizations of Fe and O ions with the number of unpaired electrons of the corresponding ions with known oxidation states. The numbers of unpaired electrons for $Fe^{3+}$ (tetrahedrally coordinated), $Fe^{4+}$ (octahedrally coordinated), and $Fe^{5+}$ (octahedrally coordinated) were 5, 4, and 3, respectively. In the original $Li_5FeO_4$ phase, the magnetizations were around 4.1 for all Fe ions, implying an overall 3+ oxidation state. After 2 Li ions and a slight amount of O were extracted (x=2, y=0.5), seven Fe ions showed magnetizations around 3.5, while the other seven remained around 4.1, indicating that half of the Fe ions had been oxidized to 4+. After lithiating the $Li_3FeO_{3.5}$ back to $Li_4FeO_{3.5}$ (x=1, y=0.5) during the reversible cycling between 1 V and 3.8 V, all Fe ions exhibited magnetizations around 4.0, indicating a complete reduction of $Fe^{4+}$ to $Fe^{3+}$. After the extraction of 3 Li and 1 O per formula unit (x=3, y=1), the Fe magnetization distribution stayed almost the same with the $Li_3FeO_{3.5}$ phase; whereas, four Fe ions showed magnetizations around 4.1, corresponding to the oxidation state of 3+, and five Fe ions showed magnetizations around 3.5, corresponding to the oxidation state of 4+. In the final phase (x=4, y=2), most Fe ions (22 of 25) showed magnetizations around 4.1, corresponding to oxidation state of 3+ and indicating the reduction of most $Fe^{4+}$ by additional O removal. Three Fe ions showed smaller magnetizations around 3.5 and 3, corresponding to oxidation states of 4+ and 5+, which were expected considering the complex local environments for specific Fe ions in the amorphous structure.

A similar analysis was performed for the magnetization of the oxygen ions. The magnetizations of oxygen ions in the original $Li_5FeO_4$ were close to 0, corresponding to an overall valence state of 2− for oxygen ions. After the extraction of 2 Li and 0.5 O per formula unit (x=2, y=0.5), several oxygen ions (7 of 49) showed increased magnetizations around 0.5, indicating the partial oxidation of $O^{2-}$ to $O^{1-}$. In the following re-lithiated phase ($Li_4FeO_{3.5}$), all the oxygen ions exhibited magnetizations around 0 again, indicating the full reduction of $O^{1-}$ to $O^{2-}$. With further Li and O removal (x=3, y=1), a similar portion of oxygen ions (4 of 27) showed increased magnetizations. In the final phase (x=4, y=2), magnetizations of oxygen ions showed a relatively wide distribution corresponding to various oxygen-ion local environments in the amorphous structure. No oxygen ions showed magnetization above ~0.4, indicating the overall oxidation state of 2− for oxygen ions.

Effect of Local Atomic Environments on the Electronic States of O and Fe Ions

The atomic environments of Fe and O ions in cation-disordered rocksalt phases $Li_4FeO_{3.5}$, $Li_3FeO_{3.5}$, and $Li_2FeO_3$, and their effects on the electronic states of O ions, were examined and are shown in FIG. 5D. During the first delithiation step of $Li_5FeO_4$ with 2 Li ion and slight (0.5) O removal, a concurrent phase transition occurred from anti-fluorite to cation-disordered pseudo-cubic, which brings Li-excess O ion configurations (FIG. 5D) to the system. In the resulting $Li_3FeO_{3.5}$ phase, all the $O^{1-}$ ions were identified to be in the particular "$Li_6$—O" configuration (FIG. 5D), with only Li ion coordination (first nearest neighbors), while the remaining oxygen ions stay as $O^{2-}$ with at least one Fe first nearest neighbor. The projected DOS (pDOS) of the oxygen 2p states and iron 3d states of these two configurations are shown in FIGS. 5B and 5C. For the $Li_6$—O configuration (FIG. 5B), the contribution from oxygen to the valence band immediately below the Fermi level was significantly larger than that from Fe, which showed that electrons could be readily extracted from oxygen when the system was being oxidized. On the contrary, for the partially Fe-coordinated configurations (FIG. 5C), the Fe—O bonds showed strong covalency, and both cationic and anionic activities could be expected during further charging. The cationic/ionic redox that occurred during delithiation could qualitatively be demonstrated via the locations of the holes generated by extracting electrons from $Li_3FeO_{3.5}$. The isosurface shown in the inset of FIG. 5B was constructed by visualizing the charge density in the energy range between 0 and −1 eV, which roughly corresponded to the removal of one electron. Apparently, the hole was localized around the oxygen atom in the center of $Li_6$—O, which signaled the ionic redox behavior. On further delithiation, the $O^{1-}$ in the local Li-excess environment originating from this particular $Li_6$—O configuration may have given out one labile electron and become $O^0$. The irreversible delithiation from $Li_3FeO_{3.5}$ to $Li_2FeO_3$ and $LiFeO_2$ proceeded by gradual oxidation of $O^{1-}$ to $O^0$ and elimination of these specific $Li_6$—O configurations (FIG. 5D). Nevertheless, these $Li_6$—O configurations would have been retained during the re-lithiation to $Li_4FeO_{3.5}$, with the oxygen ions being reduced to $O^{2-}$. As shown in FIG. 5A, the Fe contribution to the states lying below the Fermi level was almost negligible compared with that from oxygen, and the isosurface corresponding to one electron removal was also centered around the oxygen ion; therefore, significant anionic redox was expected. Labile electrons extracted from the $Li_6$—O configuration enabled the partial oxidation of $O^{2-}$ to $O^{1-}$. The $O^{2-}$ redox couple in this specific configuration, along with the $Fe^{3+}/Fe^{4+}$ redox couple, thus played a key role during the reversible cycling between $Li_4FeO_{3.5}$ and $Li_3FeO_{3.5}$.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A lithium ion battery comprising:
a cell comprising:
a cathode comprising lithium iron oxides having the formula $Li_{5-2\alpha-x}FeO_{4-\alpha}$, where $0 \leq x \leq 1$ and $0 < \alpha < 2$, the lithium iron oxides comprising a disordered rock salt phase in which the oxygen atoms are each octahedrally coordinated to six lithium atoms;
an anode in electrical communication with the cathode; and
an electrolyte disposed between the anode and the cathode; and
a charge controller that limits a charging voltage of the cell to a voltage that prevents the irreversible delithiation of the lithium iron oxides and the elimination of the disordered rock salt phase during charging.

2. The battery of claim 1, wherein $0 < \alpha < 1$.

3. The battery of claim 1, wherein the charge controller limits the charging voltage of the cell to a voltage of 3.8 V or lower vs. $Li^+/Li$.

4. The battery of claim 1, wherein the disordered rock salt phase comprises lithium iron oxides having the formula $Li_4FeO_{3.5}$, lithium iron oxides having the formula $Li_3FeO_{3.5}$, or a combination thereof.

5. A method of operating a lithium ion battery comprising:
a cell comprising:
a cathode comprising lithium iron oxides having the formula $Li_{5-2\alpha-x}FeO_{4-\alpha}$, where $0 \leq x \leq 1$ and $0 < \alpha < 2$, the lithium iron oxides comprising a disordered rock salt phase in which the oxygen atoms are each octahedrally coordinated to six lithium atoms;
an anode in electrical communication with the cathode; and
an electrolyte disposed between the anode and the cathode; and
a charge controller that limits a charging voltage of the cell to a voltage that prevents the irreversible delithiation of the lithium iron oxides and the elimination of the disordered rock salt phase during charging, the method comprising
charging the cell using a charging voltage that prevents the irreversible delithiation of the lithium iron oxides and the elimination of the disordered rock salt phase during charging; and
discharging the cell to power a load connected across the cell.

6. The method of claim 5, wherein a charging voltage of 3.8 V or lower vs. $Li^+/Li$ is used.

7. A method of forming a lithium ion battery, the method comprising:

activating a cathode comprising lithium iron oxides having the formula $Li_5FeO_4$ in an activation charge cycle at a voltage that converts the lithium iron oxides having the formula $Li_5FeO_4$ to lithium iron oxides having the formula $Li_{5-2\alpha-x}FeO_{4-\alpha}$, where $0 \leq x \leq 1$ and $0 < \alpha < 2$, the lithium iron oxides comprising a disordered rock salt phase in which the oxygen atoms are each octahedrally coordinated to six lithium atoms;

assembling a cell comprising:

the cathode;

an anode in electrical communication with the cathode; and an electrolyte disposed between the anode and the cathode; and connecting a charge controller to the cell, wherein the charge controller limits the charging voltage of subsequent charging cycles to a voltage that prevents the irreversible delithiation of the lithium iron oxides and the elimination of the disordered rock salt phase during charging.

8. The method of claim 7, wherein $0 < \alpha < 1$.

9. The method of claim 7, wherein the charge controller is configured to limit the charging voltage of the cell to a voltage of 3.8 V or lower vs. $Li^+/Li$.

10. The method of claim 7, wherein the cathode is activated before it is assembled into the cell.

11. The method of claim 7, wherein the cathode is activated after it is assembled into the cell.

12. An electronic device comprising an electrode, the electrode comprising lithium iron oxides having the formula $Li_{5-2\alpha-x}FeO_{4-\alpha}$, where $0 \leq x \leq 1$ and $0 < \alpha < 2$, the lithium iron oxides comprising a disordered rock salt phase in which the oxygen atoms are each octahedrally coordinated to six lithium atoms.

13. The device of claim 12, wherein $0 < \alpha < 1$.

* * * * *